April 16, 1929.  G. GODDU ET AL  1,709,347
MACHINE FOR OPERATING ON BOOTS AND SHOES
Filed March 28, 1923  7 Sheets-Sheet 1

INVENTORS

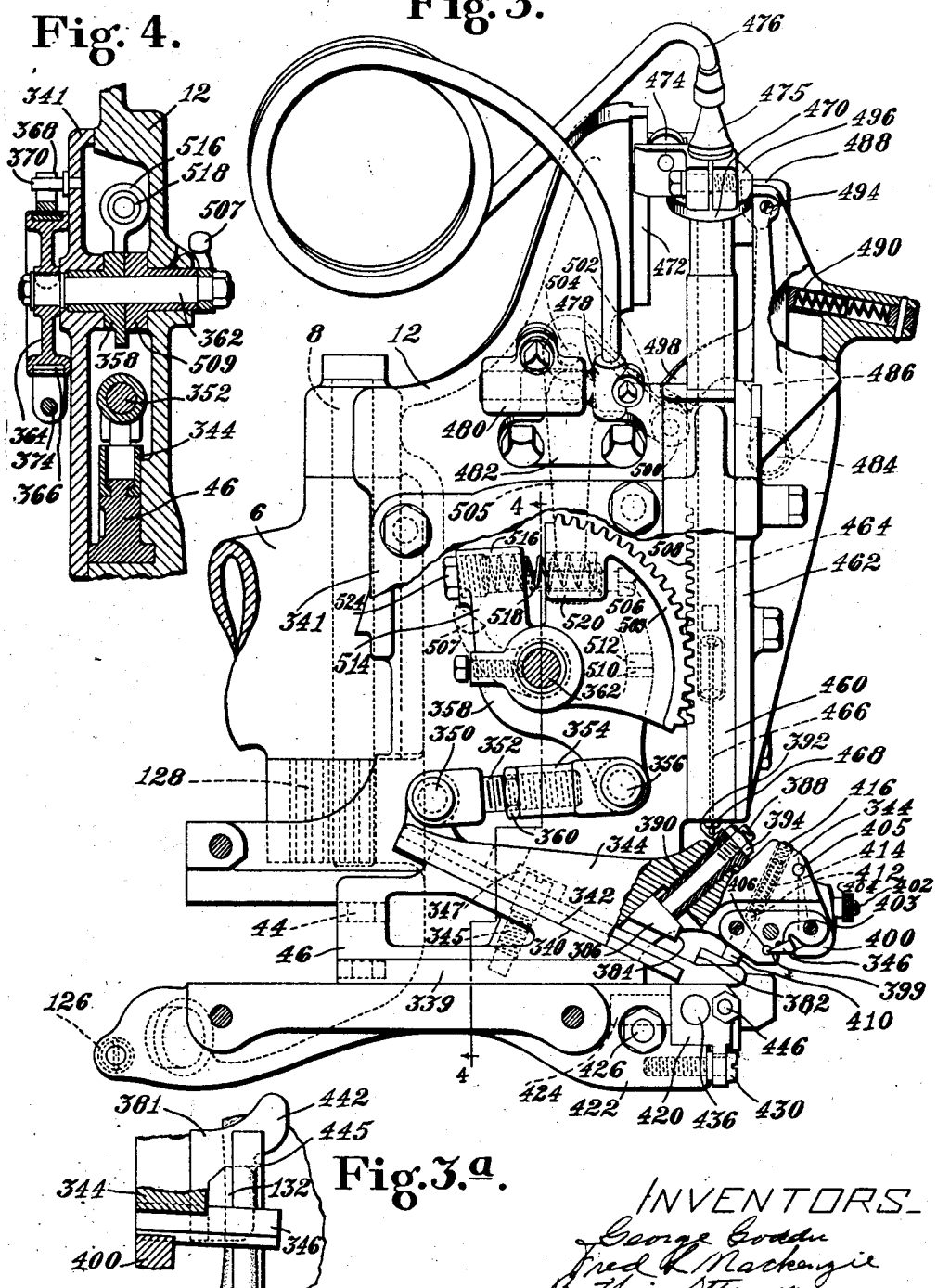

April 16, 1929.  G. GODDU ET AL  1,709,347
MACHINE FOR OPERATING ON BOOTS AND SHOES
Filed March 28, 1923  7 Sheets-Sheet 4
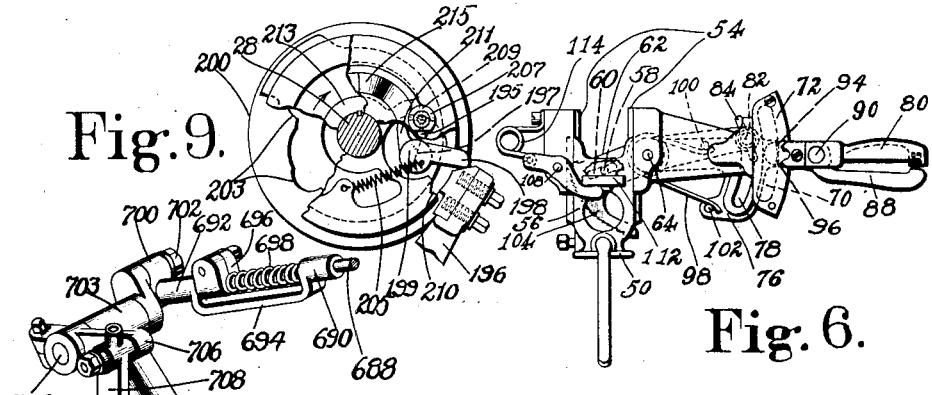
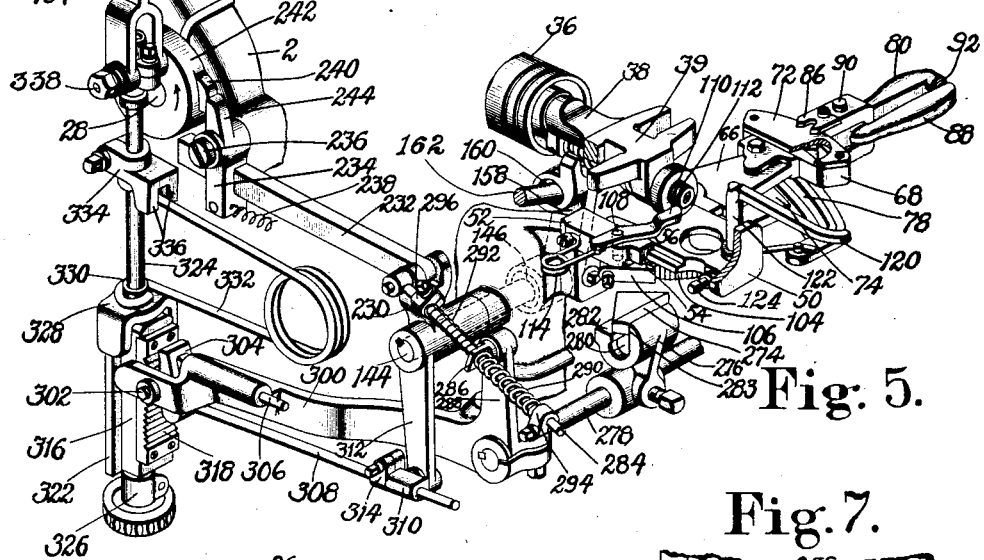
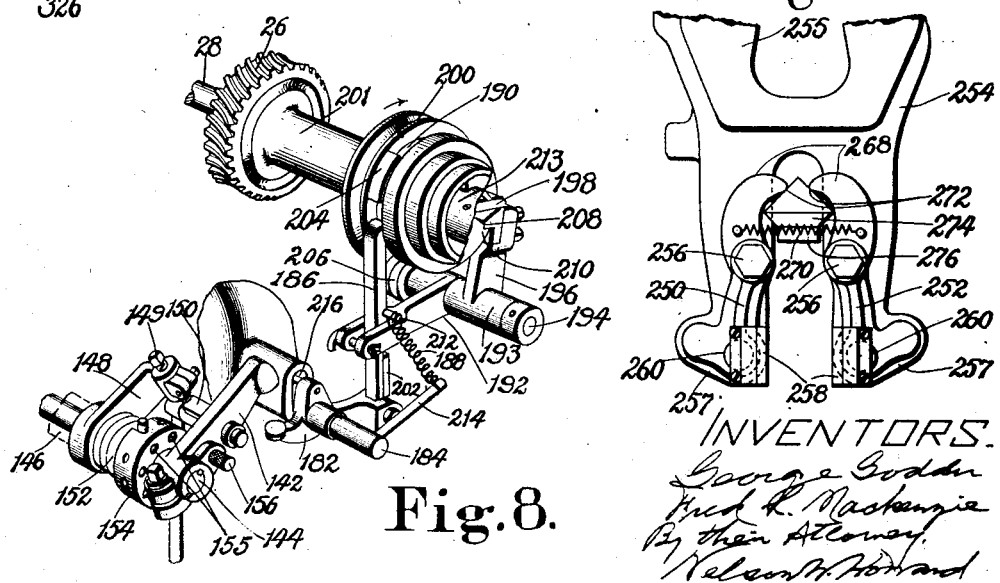

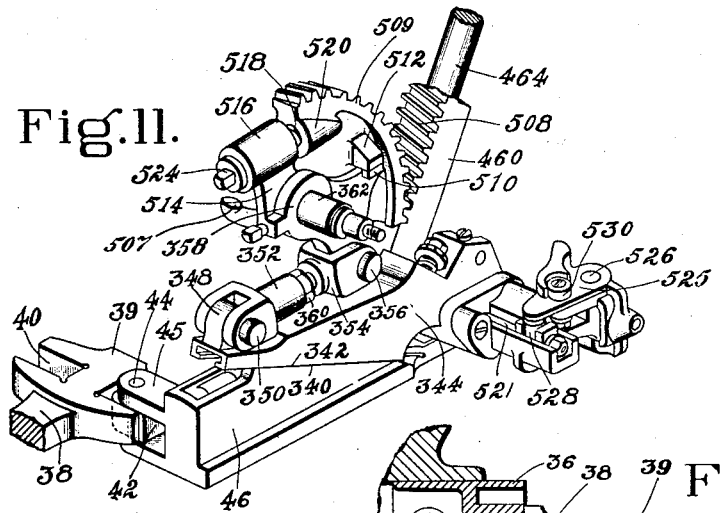

April 16, 1929.

G. GODDU ET AL 1,709,347

MACHINE FOR OPERATING ON BOOTS AND SHOES

Filed March 28, 1923

Patented Apr. 16, 1929.

1,709,347

UNITED STATES PATENT OFFICE.

GEORGE GODDU, OF WINCHESTER, AND FRED L. MACKENZIE, OF BEVERLY, MASSACHUSETTS, ASSIGNORS TO UNITED SHOE MACHINERY CORPORATION, OF PATERSON, NEW JERSEY, A CORPORATION OF NEW JERSEY.

MACHINE FOR OPERATING ON BOOTS AND SHOES.

Application filed March 28, 1923. Serial No. 628,234.

This invention relates to machines for operating upon boots and shoes. The invention is illustrated as embodied in a machine for preparing a welted, unsoled shoe for the sole laying operation. Such machines are known as welt butting and tacking machines and include devices for locating the shoe and supporting the welt ends for the butting operation, cutters for butting the welt, that is, beveling or scarfing off each end of the welt, and tackers for securing the upper to the insole at points adjacent to the ends of the butted welt.

Objects of the present invention are to improve generally machines of this type without sacrificing any of the advantages incident to the prior constructions, and to produce a machine which will be more nearly automatic and more effective in its operation and which will consume less time of the operator than prior machines of this type.

A feature of the invention relates to the work supporting means and consists in means for effecting a uniform predetermined pressure of the work supporting pads against the work irrespectively of the size of the shoe. As illustrated, after the shoe has been located by a back rest and by the welt supports, the work supporting pads are brought manually against the opposite sides of the last below the bulge of the last with preliminary pressure by means which effects equal pressure on the two sides of the last irrespectively of the shape of the last or the position it has been made to assume by the welt supports, this preliminary pressure being for the purpose of sustaining the shoe during a portion of the operation of the machine, for example, the welt butting operation. During other operations upon the shoe, for example, the pressing of the upper against the shoe bottom and securing it in place, additional sustaining pressure is required, and accordingly during the power operation of the machine the shoe support operating mechanism is picked up in the position in which it was left in effecting manually the preliminary pressure and a predetermined uniform additional pressure is applied to the support.

A further feature of the invention relates to the mechanism for positioning the shoe longitudinally and comprises a back rest which is yielding to pressure of the shoe as the shoe is introduced longitudinally between the welt supports, so that the longitudinal position of the shoe with relation to the welt supports may be determined by inspection of the operator, with means becoming operative after the machine starts to lock the back rest against rearward movement, so that the shoe is held from movement during the operation of the welt butting knives and is properly located for the introduction of the upper holding tacks. A novel height gage is also provided for assisting the operator in guiding the shoe into the machine and locating it vertically in proper relation to the welt supports. As shown, the height gage is adjustably supported on the back rest.

Another feature of the invention consists in a novel organization of the tacking mechanism to ensure that the tacker nozzles will be pressed against the work irrespectively of variations in the thickness of the shoe materials and irrespectively of slight variations in the vertical position of the last bottom, it being important that the upper, which has been tightened over the last, be pressed firmly against the last bottom and the tacks fully driven to hold it in place. As illustrated, the tackers for securing the tightened upper are forced against it to press it firmly upon the shoe bottom prior to the insertion of the tacks by pressure which is effected by yielding means and, after a substantial predetermined pressure has been effected, the drivers are tripped and the tack driven, the organization being such that the blow of the driver is dealt on the tack and after the tack is driven, upon the tacker nozzle, to compress the stock.

These and other features of the invention, including novel knife operating and holding mechanism, novel forms of the welt supports, a novel arrangement of the anvil which co-operates with the knife in severing the stock, and various novel constructions and arrangements of parts, will appear more fully from the following description when read in connection with the accompanying drawings and will be pointed out in the appended claims.

The tack supplying and handling mechanism, herein disclosed but not claimed, forms the subject-matter of a divisional application Serial No. 180,274, filed April 1, 1927; and the safety device for permitting the machine to be safely turned over by hand, herein disclosed but not claimed, forms the subject-matter of a divisional application Serial No. 257,494, filed February 27, 1928.

In the drawings,

Fig. 3 is a side view of one of the swinging side frames, the parts being broken away;

Figure 15:
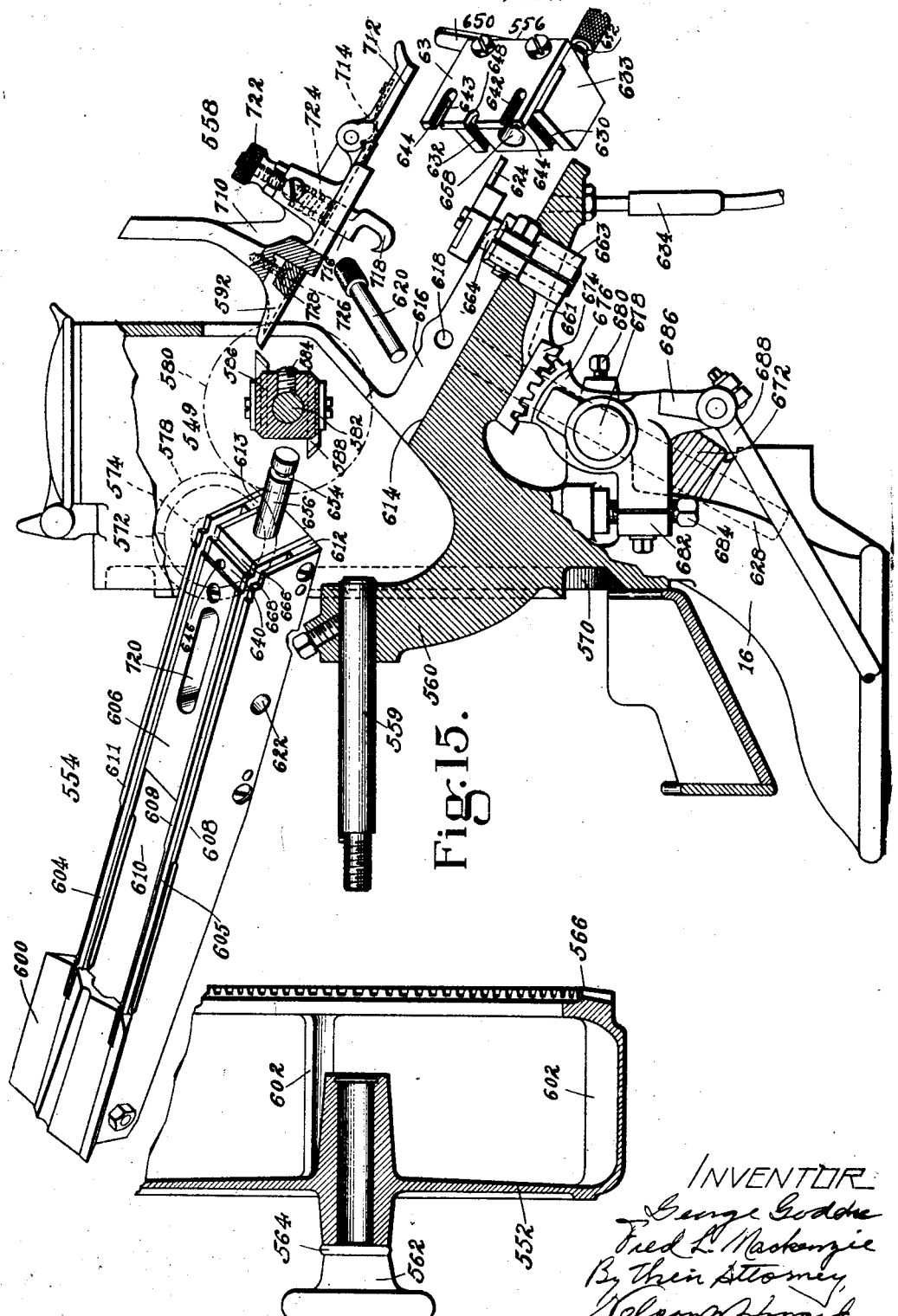
Figure 16:
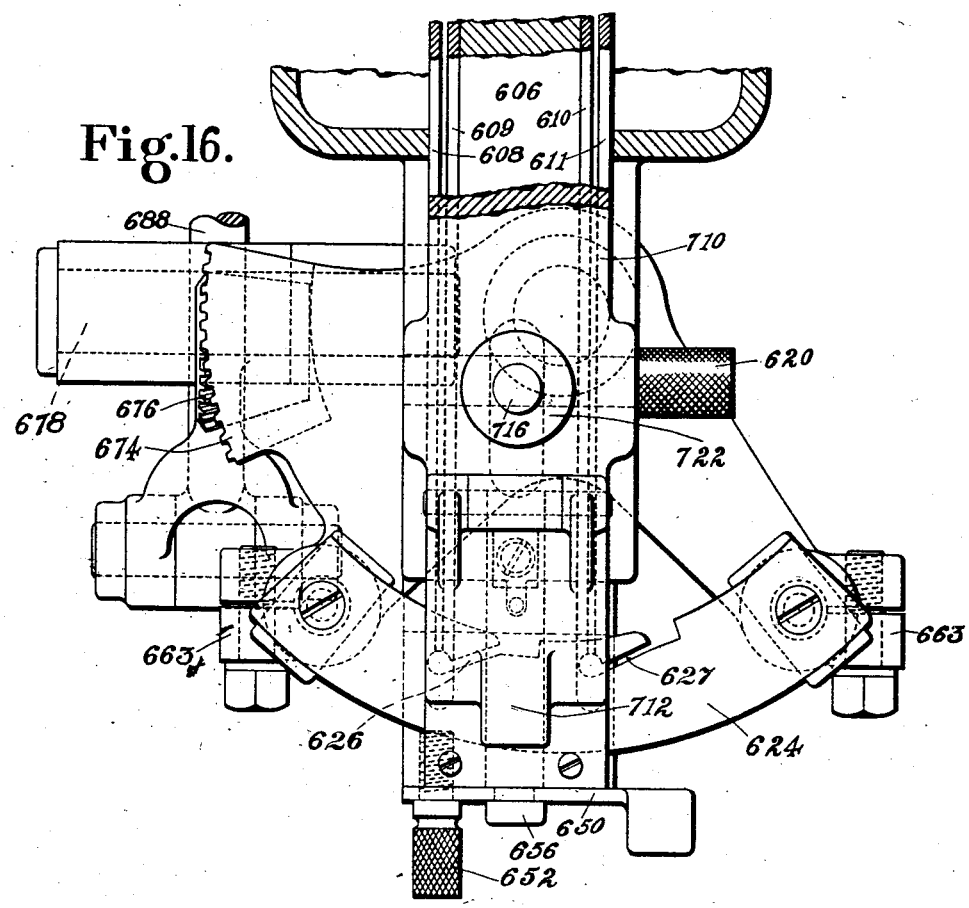

Fig. 3ª is a detailed view in plan of one of the butting knives and adjacent parts;

Fig. 4 is a sectional detail on the line 4—4 of Fig. 3;

Fig. 5 is a perspective, skeleton view of the shoe positioning and supporting mechanism with which the machine is provided;

Fig. 6 is a plan view of the positioning mechanism;

Fig. 7 is a plan view of the shoe supporting mechanism;

Fig. 8 is a perspective detail of mechanism relating to the clutch;

Fig. 9 is a detail in side view of the clutch mechanism;

Fig. 10 is a sectional view of the work positioning and supporting mechanism;

Fig. 11 is a perspective detail of the operating mechanism for the butting knives and tackers;

Fig. 12 is an enlarged detail showing the relation of one of the butting knives and the adjacent parts to the welt during the operation of the knife;

Fig. 13 is an exploded perspective view showing details of one of the welt supports and its mounting;

Fig. 14 is a perspective detail of a modified form of welt support;

Fig. 15 is an exploded perspective view partly in section of the tack handling mechanism; and Fig. 16 is a plan view of parts shown in Fig. 15, particularly the tack separating mechanism.

The general organization of the machine is similar in many respects to that of the machine disclosed in United States Letters Patent No. 1,373,553, granted April 5, 1921, on application of Edward Erickson to which reference may be had for explanation of parts of the mechanism not fully given herein.

The embodiment of the invention illustrated in the drawings provides mechanism for positioning the shoe, mechanism for supporting the shoe, mechanism for tightening the upper over the last at opposite sides of the shoe and for supporting the welt ends simultaneously, and mechanism for inserting tacks to secure the tightened upper to the innersole. These various mechanisms are mounted upon a head 2 supported upon a column 4, the head having a forwardly projecting goose neck 6 at the front of which are journaled vertical pintle shafts 8, 10 on which are pivoted swinging side frames 12, 14. The side frames support the welt butting mechanism and the tacking mechanism with the exception of the tack handling mechanism which is carried by a supporting frame 16 secured to a table 18 cast on the upper side of the goose neck 6.

The moving parts are driven by pulley 20 on a shaft 22 extending longitudinally of the machine which carries a spiral gear 24 meshing with a second spiral gear 26 fixed to a sleeve loose on a shaft 28 at right angles to the shaft 22. The shaft 28 is normally at rest but may be connected, at the will of the operator, with the driven spiral gear 26 by means of a clutch which is of the single revolution type. The actuating mechanism by which various operating instrumentalities of the machine are operated comprises a connecting rod 32, one end of which is associated with a crank 34 forming a part of the shaft 28 and the other end of which is connected to a piston 36 which is guided within a cylindrical way cast centrally in the lower part of the goose neck 6. Projecting from the forward end of the piston 36 is a connecting rod 38, which is provided with an H-shaped head 39 (Figs. 5 and 10) which lies horizontally with the legs of the H pointing outwardly toward the side frames 12, 14. The slots 40 formed between the legs of the H carry slide blocks 42 which are drilled verticaly for the reception of vertical pins 44 that are carried in ears 45 that project inwardly from the welt butting cutter operating slides 46. With this construction, a rotation of the crank 34 to draw the piston 36 rearwardly causes the slides 46 to be actuated in a rearward direction to effect the operation of the welt butting and tacking mechanisms. The slides 46 are mounted for sliding movement in the respective side frames 12, 14, which, in their operative positions, are usually at an angle to the line of movement of the piston 36. Irrespective of this angularity, the slide block connections just described between the slides and the H-shaped head 39 of the connecting rod 38, insure proper operation, inasmuch as the slots 40 in the H-shaped head 39 provide for movements of the sliding blocks 42 relatively to the head 39 during movement of the side frames 12, 14, toward and from each other and during actuation of the slides 46 to operate the welt butting cutters and the tackers. Further description of the welt butting and tacking mechanisms will be deferred until the mechanisms for positioning and supporting the shoe have been described.

In order to position the shoe for the proper engagement of the welt supports with the welt crease, the machine is provided with a back gage 50 which may be adjusted longitudinally so as to locate the heels of shoes of different sizes properly for the inward movement of the welt supports. Referring to Figs. 5, 6 and 10, the lower portion of the machine head is provided with a bracket 52 in which are formed horizontal ways 54, within which the shank 56 of the back gage 50 can slide. Depending from the shank of the back gage is a pin 58 which engages a slot 60 in a lever 62, extending horizontally to the right, and loosely pivoted upon a vertical pivot screw 64 (Fig. 6) extending upwardly into a horizontal arm 66 which is a part of the bracket 52 and extends to the right beneath the side frame 14. At the outer end of the arm 66 is a lock plate 68. The lock plate 68 has a slot 70 which extends on an arc struck from the pivot 64 as a center. The slot is covered by a thin brass plate 72. A second lever 74, below the lever 62, is fulcrumed at its inner end on the screw 64, is provided between its ends with an enlargement 76 having an arcuate slot 78 struck from the pivot screw 64 as a center and extends outwardly in the form of a handle 80. The lever 62 may be clamped to the lever 74 by means of a screw 82 having a wing head 84, the screw 82 passing upwardly through the slot 78 of the lever 74 being threaded into the outer, or right-hand end, of the lever 62. The handle 80 of the lever 74 carries a pointer 86 overlapping the plate 72. The handle portion of the lever is provided with a locking device comprising a pressure piece 88 loosely pivoted at 90 on the handle 80 and normally held away from the handle by a coil spring 92 interposed between the end of the pressure piece and the handle. The inner end of the pressure piece extends from beneath into the slot 70 and is provided with two angular gripping faces 94 and 96, shown in dotted lines in Fig. 6, which are so constructed as normally to bite into the outer vertical side of the slot 70, and thus hold the back gage 50 in any desired position of adjustment. Pressure of the spring 92 will cause the gripping faces 94, 96 to bite and hold the lever 74 against forward movement, while a movement of the pressure piece 88 toward the handle 80 will withdraw both faces from engagement with the wall of the slot 70 and permit free movement of the lever 74. It will be observed that by locking the lever against forward movement the back gage is locked against rearward movement provided the wing screw 82 is tightened.

With the construction just described, it will be seen that by means of a movement of the lever 74 about the pivot 64, the lever 62 is also moved and the back gage is slid in or out of its ways 54. The brass plate 72 may be provided with index marks to which the pointer 86 may be brought for positioning the back gage properly to locate the welt butts on different sizes of shoes. In factories where the index marks on the plate 72 do not give a correct location of the back gage for the particular style of shoe which that factory manufactures, an adjustment of the lever 62 relative to the lever 74 by loosening the screw 82 and adjusting it to different positions in the slot 78 makes it possible to compensate for such variation in style when the pointer 86 is brought to the index marks already provided.

Some operators prefer to position the shoe longitudinally with respect to the welt supports by the eye, this being readily done by reason of the fact that most innersoles in use are provided with a line or mark across them where the heel breast is to be located. This mark is very readily positioned with respect to shoulders on the welt supports which cooperate with the butting knives to form the welt end. Accordingly the present construction is such that by a very simple adjustment, namely, by loosening the wing screw 82 the rear end rest or gage 50 is caused to be maintained yieldingly in forward position so that it engages the shoe early in its movement in between the welt supports and is moved rearwardly by the shoe. As soon as the machine starts the rest or gage 50 is locked, in the position given it by the shoe, against further rearward movement and holds the shoe against the tendency of the cutting knives to move it rearwardly and in the proper position to receive the tacks which are driven to hold the upper in the lasted position to which it is brought by the lateral pressure of the welt supports in the welt crease.

These results are effected, in the present construction by providing a grasshopper spring 98 wrapped about the pivot 64 of the levers 62, 74 and having its ends engaging respectively a pin 100 on the lever 62 and a pin 102 on the lever 74 (Fig. 6), the spring tending to move the lever 62 counter clockwise as far as the screw 82 in the slot 78 will permit and hence holding the gage 50 in its extreme forward position. This position, however, may be varied for extreme shoe sizes by moving the handle 80 to different positions. The lever 62 is provided with a ratchet segment 104 concentric with the pivot screw 64 and a pawl 106 having a stationary pivot 108 on the bracket 52 is allowed to engage the segment 104 when the machine starts to prevent it from turning in a clockwise direction. The pivot 108 of the pawl 106 is provided with an arm 110 which, in the forward position of the butting knife and tacker operating piston 36, is engaged by a button 112 on the front end of the connecting rod 38, which button, while the machine is at rest with the button in its forward position, pushes forwardly the arm 110 and holds the pawl 106 out of engagement with the segment 104. As soon as the machine starts the button moves rearwardly, releasing the arm 110 and allowing the pawl to be moved by a spring 114 into engagement with the segment 104 to lock the gage or rest 50 against rearward movement where it remains until the cycle of the machine is nearly completed, whereupon the button 112 again engages the arm 110 and moves the pawl 106 out of engagement with the segment and unlocks the rest 50. By this construction it will be seen that the gage may be used in the manner just described and positioned automatically in accordance with the position of the shoe as determined by the operator, or by tightening the wing screw 82 the lever 62 may be connected in predetermined relation to the lever 74 which lever may be set according to size indications on the plate 72 so as to locate different shoes of the same size in predetermined relation to the operating instrumentalities, for example, the welt supports and tacking nozzle. To assist the operator in positioning the shoe between the welt supports at the proper height before they close upon the shoe a height gage is provided (Figs. 5 and 10). This comprises a finger 120 extending longitudinally of the shoe, the finger being supported for vertical adjustment by a vertical stem 122 which enters a hole in the shank 56 of the gage 50 and is held in place by a set screw 124.

The forward ends of the swinging side frames 12 and 14 are normally held apart by means of a spring 126 (Figs. 1 and 2) the ends of which are attached to the rear ends 164 of the respective side frames back of their pivots 8, 10. In order that the side frames may move together, they are provided with intermeshing toothed segments 128 and 130, respectively, through which the lower ends of the pivot rods 8 and 10 extend. Mechanism is provided to overcome the force of the spring 126 and bring together the crease finders or welt supports 132, 134 carried by the forward ends of the side frames into position to support the ends of the welt for the operations to be performed thereon. This mechanism comprises a treadle 136 (Fig. 1) which is pivoted at 138 in the lower part of the column 4 and is connected by a treadle rod 140 to a horizontal arm 142 that is keyed to a transverse rock shaft 144 journaled in the lower part of the machine head. Referring particularly to Figs. 4 and 10, on the shaft 144 there is a loose sleeve 146 having an arm 148 carrying a stop screw 149 that engages a projection 150 on the arm 142 (Fig. 8). The screw 149 is held against the projection 150 by a torsion spring 152 arranged on the shaft 144 with one end engaging the sleeve 146 and the other seated in a notch in a loose collar 154 having capstan holes in its periphery and a series of holes 155 in the outer face, any one of which may be engaged by a pin 156 passing through the arm 142 into it. The spring 152 may thus be retained under any desired tension. On the sleeve 146 is a vertical arm 158 (Figs. 5 and 10) having a bifurcated upper end which lies just beneath the connecting rod 38. In the opposite sides of the arm 158 near its upper end are recesses 160 which receive the ends of struts 162 the outer ends of which are seated in recesses formed in the inner faces of rearward projections 164 (Fig. 1) of the side frames 12, 14. The struts are normally inclined so that as the arm 158 is swung rearwardly through the spring 152 by depression of the treadle, the struts 162, 162 act as a toggle to separate the near ends of the side frames 12, 14 and hence cause their forward ends, carrying the welt supports 132, 134, to be moved toward the shoe. The pressure by which the crease finders or welt supports 132, 134 can be forced against the shoe by the treadle will depend upon the adjusted tension of the spring 152. It is desirable, however, that the welt supports 132, 134 be operated by power further to tighten the upper before the tacking operation occurs, and accordingly mechanism for effecting this action is provided. As best shown in Fig. 10, a rod 166 is guided for sliding movement in a hole 168 in the end of the piston 36 and through an ear 170 on the H-shaped head 39. On the forward end of the rod is secured the button 112 referred to before as operating the gage locking pawl 106. On the rod 166 is a fixed collar 172 between which and the ear 170 is a compression spring 174. During movement of the piston 36 rearwardly the button 112 engages the bifurcations on the upper end of the arm 158 and applies to it further force quantified by the strength of the spring 174 which force is transmitted, through the toggle struts 162, 162 as described, to the welt supports further to tighten the upper over the last before it is secured.

Figure 2:
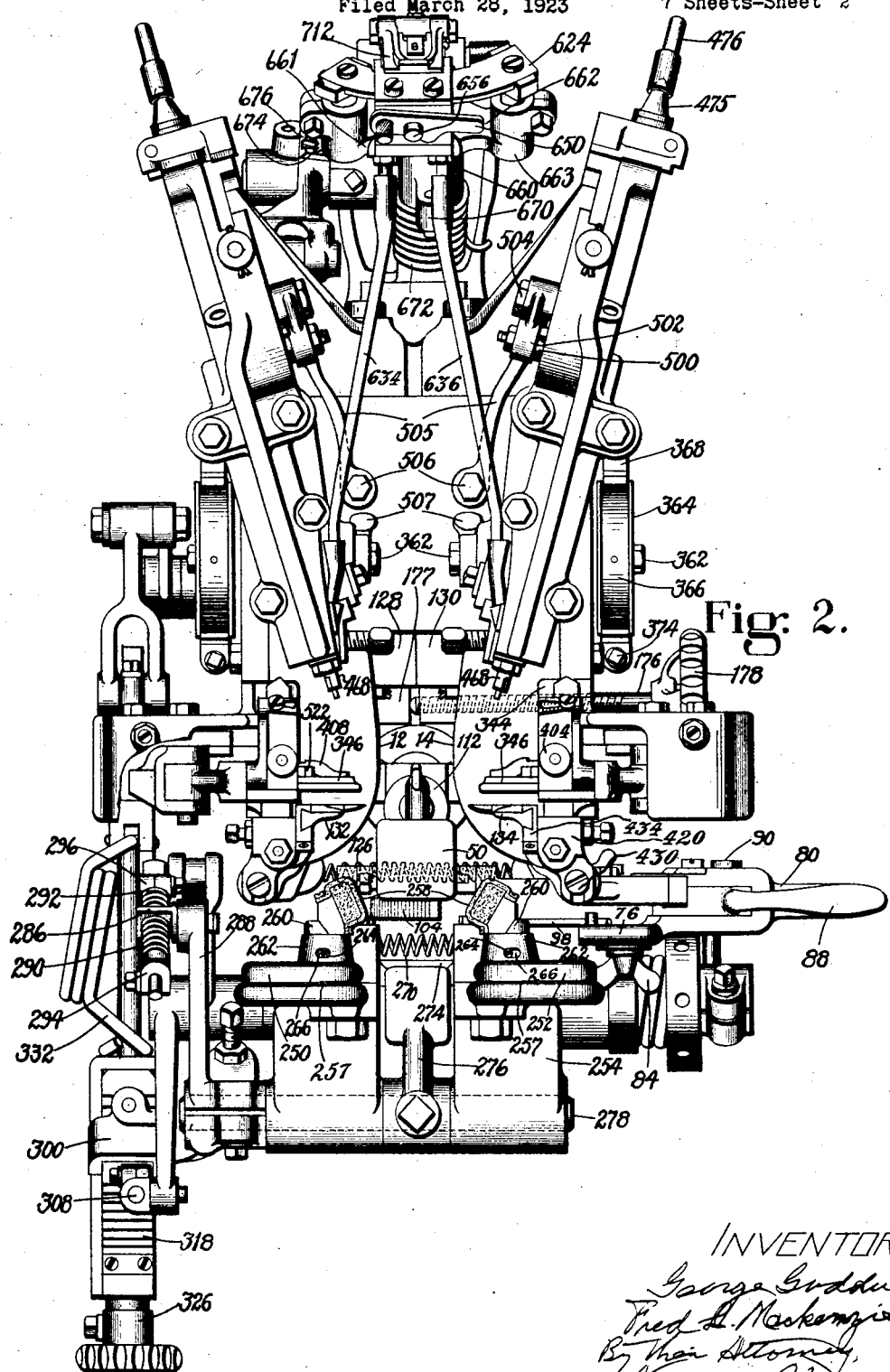
Fig. 2 is a front elevation of the head of the machine.

If the forward ends of the side frames 12 and 14 were always allowed to be opened to their fullest extent by the spring 126, a considerable inward movement would be required to cause the welt supports properly to engage and support the welts of shoes of narrow widths. In order to obviate the necessity of such an extensive movement, an adjustable stop is provided for limiting the outward movement of the forward ends of the side frames, which may be adjusted so as to provide an opening movement commensurate with the width of the shoe to be operated upon. This stop is best shown in Fig. 2 and comprises a screw 176 threaded into the rear portion of the side frame 14 and adapted to engage a wear plate 177 carried by a portion of the side frame 12. The screw 176 is provided with a hand wheel 178 by turning which the amount which the forward ends of the side frames can open under the influence of the spring 126 may be adjusted.

It will be observed that on pressing the treadle 136, which is held raised by a spring 180, only so much pressure can be applied to the upper by the welt supports as is permitted by the tension of the spring 152, for as soon as the resistance exceeds the tension of the spring, the action of said spring will cease and no further movement of the arm 148 or further straightening of the toggle formed by the struts 146 will occur. The effectiveness of the spring 152 may be varied by the adjustment described to suit the strength of the material which is being operated upon, the proper adjustment being relatively light and such as to effect a preliminary tightening of the upper and to ensure that the welt supports will be brought into proper supporting relation to the welt but not such as to subject the shoe to a pressure sufficient fully to last in the upper to its final position. Continued depression of the treadle will, however, continue to rotate the arm 142 and the rock shaft 144 (Fig. 8), which movement is utilized to operate the single revolution clutch, hereinbefore referred to, in order to effect an operative driving connection between the power shaft 22 and the shaft 28, whereby the mechanisms for operating the various moving parts of the machine are set in motion.

Referring to Fig. 8, it will be seen that as the treadle effected movement of the arm 142 is continued its rear end will engage the forward end of a lever 182 fulcrumed on a stud 184 projecting from the frame. The rear end of the lever has pivoted thereto an upright arm 186 the upper end of which is held by a spring 188 against a member 190, which rotates with the shaft 28. The arm 186 is embraced by bifurcations on an arm 192 of a sleeve 193 loose on a pin 194 projecting from the frame. On the sleeve 193 is a stop arm 196 which, at the end of a cycle, engages a clutch arm 198 and swings it into the position shown against a spring 205 (Fig. 9), in which position of the clutch arm the shaft 28 and member 190 are disconnected from the continuously driven parts including a grooved member 200 which is fixed to a sleeve 201 surrounding the shaft 28 and carrying the spiral gear 26. The clutch arm 198 is fast to a clutch pin 199 which extends inwardly and cooperates with recesses 203 formed on the inner periphery of the member 200 which forms the driving clutch member. The clutch pin is cut away or slabbed off on one side 197 so that when the clutch arm 198 is horizontal the pin 199 is free from the recesses 203. When the clutch arm 198 is freed by the stop arm 196, the spring 205 swings the clutch arm 198 downwardly and rotates the clutch pin 199 to cause it to engage one of the recesses 203 to connect the driving element 200 with the driven element 190 on the shaft 28. The purpose of the peripheral groove on the continuously driven member 200 will later appear. On the arm 186 is a block 202 which, upon movement of the rear end of the lever 182 by final depression of the treadle, engages the arm 192 and swings the stop arm 196 away from the clutch arm 198 which then is swung down by the spring 205 to set the clutch. As the member 190 rotates a projection 204 carried by it engages the arm 186 and swings it to release the block 202 from the arm 192, allowing the sleeve 193 to be rotated by a spring 206 to restore the stop arm 196 to position to engage the clutch arm 198 and release the clutch when rotation of the driven shaft 28 is completed. The stop arm 196 carries a latch 208 which engages a notch 210 beneath the clutch arm 198 and prevents reverse movement of the shaft 28. The spring 188 is arranged to pull in a downward and rearward direction between a pin 212 on the arm 186 and a pin 214 projection rearwardly from the stud 184 so that the arm 186 is moved rearwardly and downwardly and the rearward arm of the lever 182 is moved downwardly when the treadle pressure is released. Movement of the lever 182 is limited by a pin 216 on a projection of the lever which engages a hole in the frame.

In order that the machine may be safely turned over by hand while the power is on, means shown in Fig. 9 is provided for rendering the clutch arm inoperative. A spring pin has a milled head 207 slabbed off at one side and has a transverse pin 209 extending through it, which pin engages slots of one depth when the head is in the position shown in Fig. 9, and when the pin is pulled out by its head 207, turned 90 degrees and released the transverse pin 209 engages slots of a greater depth allowing a projection 195 on the inner end of the pin to lie in the path of a tail 211 on the clutch arm 198 and prevent its turning to set the clutch, even if the stop arm 196 is thrown out of engagement with the clutch arm 198. In this position of the head 207 the slabbed off side is toward the shaft 28 so that a suitable wrench may be placed over a hub 213 fixed to the shaft 28 and engaged with teeth 215 to turn the shaft 28 by hand. In the normal position of the head 207, it is in the way of the application of the wrench so that the operator has to turn the head, thereby rendering the machine safe to be turned by hand before he can use the wrench to turn it.

Figure 1:
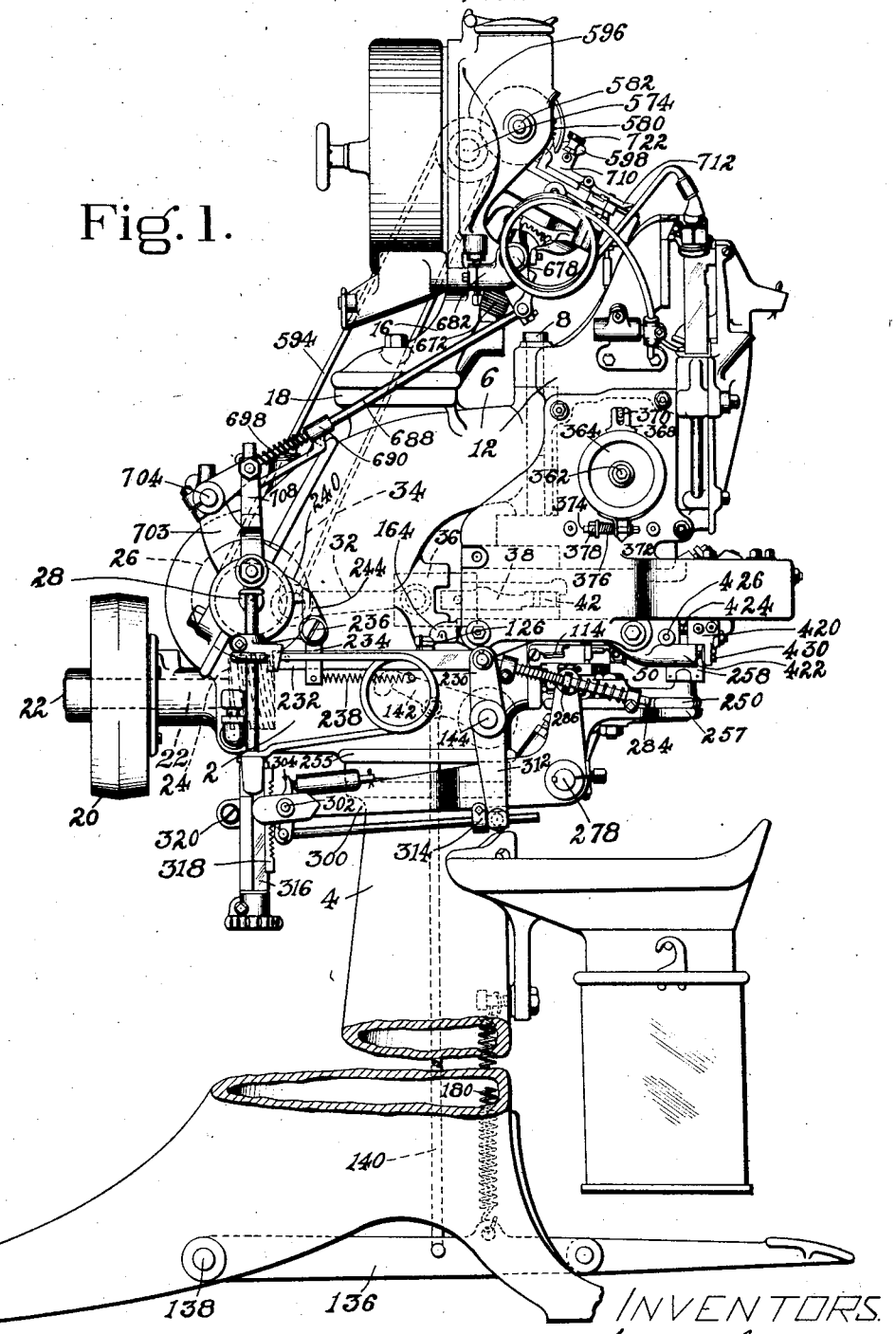
Fig. 1 is a side elevation of a machine embodying the present invention, the column being partly broken away.

In order to render it unnecessary for the operator to hold his foot on the treadle 136 after the shaft 28 and the various operating mechanisms actuated thereby have been set into motion and during the continuance of their operations, automatic means is provided for locking the swinging side frames 12 and 14 in the positions to which they have been moved by the depression of the treadle. This locking means is illustrated in Figs. 1 and 5 and comprises a vertical arm 230 that is secured to the left-hand end of the rock-shaft 144 and which is pivotally connected at its upper end to the forward end of a rectangular rod 232. The rear end of the rod extends through a rectangular opening in an arm 234 depending from and pivoted freely on a horizontal stud 236 carried by the machine frame. The lower end of the arm 234 is normally pulled forward by a spring 238 connected between the arm and the frame. When the machine is in a position of rest, a lug 240 projecting outwardly from the periphery of a disk 242 that is secured to the left-hand end of the shaft 28 is in engagement with an upwardly projecting extension 244 of the arm 234. Thus, the arm is maintained in such position that the rectangular rod 232 is capable of sliding freely through the rectangular opening in arm 234. As soon, however, as the shaft 28 has been connected to the power shaft 22 and the shaft 28 begins to rotate, the lug 240 is removed from its engagement with the extension 244, thus permitting the spring 238 to rock the arm 234 to an angular position with relation to the rod 232, whereby the corners of the opening in the arm above and below the rod are caused to bite and bind on the rod to prevent its forward movement and act as a lock to prevent the rock shaft 144 from being rotated to initial position by the springs put under tension by depression of the treadle if the treadle is released.

The swinging side frames remain locked in their inner shoe supporting positions during the cycle of operation of the several mechanisms which operate upon the shoe and until just prior to the time when the clutch is thrown out to disconnect the shaft 28 from the power shaft 22, at which time the lug 240 on the periphery of the disk 242 is again brought into cooperative engagement with the extension 244 of the pivotally mounted locking arm 234. This locking arm is thereby returned to its initial position normal to the rod 232 so as to release the rod and the rock shaft 144, whereupon the spring 126 which connects the rear ends of the side frames 12 and 14 operates to swing the frames outwardly about their pivot rods 8 and 10 and thus release the shoe from its engagement with the welt supports 132, 134. The treadle spring 180 also functions to restore the treadle 136 and mechanism associated therewith to their initial inoperative positions.

Firmly to support the shoe for the performance of the welt butting operation and to sustain it against the pressure of the tacker nozzles and the blows of the tack drivers, a work support is provided comprising a pair of oppositely disposed clamping arms 250, 252 (Figs. 2 and 7), which are carried by a bracket 254 at the front of the head 2. The bracket 254 consists of a two-armed forward extension of a flat plate 255 which is interposed horizontally between the head 2 and the supporting column 4 of the machine, and is rigidly held in place by the bolts that secure together the head and the column. The clamping arms 250, 252 are mounted for horizontal swinging movement on pivot studs 256 rising from the arms of the bracket 254. At its forward extremity, each clamping arm carries a shoe supporting pad 258, the pads being adapted to engage the counter portion of the upper below the bulge of the last and above the comb of the last, on opposite sides of the shoe. The pads are constructed of suitable soft or yielding material to prevent injury to the shoe. Each pad is mounted on one side of a cylindrical stem 260 (Fig. 2) extending downwardly into a vertical socket 262 in one of the clamping arms. The stems 260 are confined in the sockets 262 by means of retaining screws 264, which are threaded into the stems and project through transverse slots 266 in the walls of the sockets, the slots permitting the stems to turn a limited amount in their sockets and thus enabling the pads to adjust themselves to the longitudinal angularity of the opposite sides of the counter portion of the upper. The shoe-engaging faces of the pads 258 are disposed at a slight angle to their stems 260, in order that they may conform to the vertical pitch of the opposite sides of the shoe. In order to reinforce the clamping arms against the downward thrust imparted thereto by the blows of the tacker mechanism, the arms of the bracket 254 are extended forwardly, beyond the pivot studs 256, and terminate in flat segmental bearing faces 257 which engage similar bearing faces on the under side of the clamping arms at the forward ends of the latter. With such a construction a wide bearing surface is provided for the clamping arms, however they may be positioned on their pivots 256 while supporting the shoe.

The supporting pads 258 are moved into supporting engagement with the shoe after the shoe has been positioned between the welt supports 132, 134 and during the manual movement of the welt supports into the welt crease. After the machine starts additional clamping pressure is applied to the pads by power means more firmly to sustain the shoe during the tacking operation. The pads are retracted from the shoe before it stops to facilitate removal of the shoe after the welt butting and tacking operations are completed. Mechanism is provided for effecting preliminary or initial actuation of the clamping arms 250, 252 to swing the pads against the sides of the shoe in conjunction with the manually effected movement of the side frames 12, 14 to locate the welt supports 132, 134 in the welt crease. To this end each clamping arm 250, 252 is provided with a rearward extension 268, the arm and the extension constituting a lever which is fulcrumed upon the pivot stud 256. The extensions 268 of the clamping arms curve inwardly toward each other and are connected by a coiled spring 270 which tends to swing the forward ends of the clamping arms apart and to hold the inner extremities of the clamping arm extensions 268 in engagement with a pair of inclined faces 272 that are formed on opposite sides of a wedge-block 274, by means of which the clamping arms are actuated. The wedge-block 274 (Figs. 5, 7 and 10) is carried at the upper end of an arm 276 which is secured to a rock-shaft 278 that is journaled in bearings in the bracket 254 (Fig. 2).

In order that the shoe supporting pads may be positioned properly to support right and left shoes, or shoes of different styles and sizes, provision is made for permitting lateral swinging movement of either of the clamping arms independently of the other arm, or of both together so that both may engage the shoe irrespectively of the lateral position of the shoe as determined by the welt supports 132, 134. To this end the wedge-block 274 has a sliding or floating connection with its supporting arm 276, which insures that the extension 268 of both clamping arms will be engaged by the wedge-block before any pressure tending to clamp the shoe is applied to either of said arms. This floating connection is attained by means of a lug 280 of the shape shown in Fig. 10, the lug depending from the under side of the wedge-block, which lug is arranged for lateral sliding movement in a correspondingly shaped groove in the top portion of the supporting arm 276. The upper end of the arm 276 has a flattened face 282 to engage a flat bearing face on the under side of the wedge-block 274 and another flattened face 283 to engage the front face of the wedge-block. The wedge-block is thus supported against longitudinal tilting relatively to its supporting arm while free lateral movement of the block relatively to the arm 276 is permitted.

The rock shaft 278 is given its preliminary movement initially to locate the shoe sustaining pads against the shoe and apply some pressure thereto by the following mechanism: The arm 230 of rock shaft 144, which has pivoted to it the locking rod 232, carries also by the same pivot a rod 284. The rod 284 extends freely through an ear 286 pivoted in the upper end of an arm 288 secured to the rock shaft 278. On the rod 284 at one side of the ear 286 is a strong spring 290 and on the other side of the ear is a lighter spring 292, the springs being held respectively by adjustable stop collars 294, 296. As the shaft 144 is rocked by movement of the treadle, the rod 284 acts through the spring 290 to turn the rock shaft 278 in a direction to move the wedge block rearwardly and close the shoe supporting pads upon the shoe, this movement taking place concurrently with the movement of the welt supports 132, 134 into the welt crease. After the machine starts the tension of the spring 290 is maintained by reason of the locking of the bar 232 as described, even if pressure on the treadle is relieved.

To apply automatically to the pads a predetermined amount of additional pressure, irrespectively of the positions which the pads are made to assume by the size, shape or lateral position of the shoe by the preliminary manually effected pressure, the following mechanism is provided: Secured to the shaft 278 and extending rearwardly is a long arm 300 the rear end of which is bifurcated. Between the bifurcations is pivoted at 302 a pawl 304. A spring plunger 306 is arranged in the arm 300 to engage the pawl above its pivot. Below its pivot 302 the pawl has pivoted thereto a forwardly extending rod 308 which passes loosely through an ear 310 pivoted to the lower end of an arm 312 formed on the hub of the arm 230 and hence fast on the shaft 144. On the rod 308 is an adjustable collar 314 which the ear 310 normally engages to hold the pawl 304 forwardly against the pressure of the spring plunger 306. The bifurcations of the arm 300 embrace a block 316 upon the front face of which is a plate formed with ratchet teeth 318 to be engaged by the pawl 304. One of the bifurcations of the arm 300 is extended (Fig. 1) and carries a roll 320 engaging the rear face of the block 316 to hold it forwardly in operative relation to the pawl 304. The end of the other bifurcation rests against a longitudinal rib 322 to hold the block rearwardly with respect to the pawl. The block 316 is bored longitudinally to receive loosely a rod 324 the lower end of which is threaded to receive a split clamp nut 326, by turning which the position of the block, longitudinally of the rod 324, may be adjusted. A yoke piece 328 having a sleeve 330 is loosely mounted on the rod and has its arms embracing the upper end of the block 316. A strong grasshopper spring 332 has one end bent around the sleeve 330 of the yoke piece 328 and its other end bent around the rod 324 higher up where it is held by a split clamp 334 having a forked portion 336 embracing the spring to prevent its turning on the rod. The upper end of the rod 324 is connected to a crank pin 338 on the disk 242 of the shaft 28.

When the treadle is depressed the shaft 144 turns counter-clockwise (Figs. 2 and 4), moving the arm 230 rearwardly and applying pressure through the spring 290 to turn the shaft 278 and force the wedge block 276 rearwardly to close the pads 258 against the shoe, the wedge block shifting laterally to equalize the pressure on the two sides of the shoe. Turning of the shaft 278 lowers pawl 304 with respect to the teeth 318 an amount depending on the distance the pads 258 are held apart by the interposed shoe. By the same movement of the shaft 144 the arm 312 is moved forwardly, removing the ear 310 from pressure on the collar 314 and allowing the spring plunger 306 to push the pawl 304 into engagement with the teeth 318. The spring 290, as well as the spring 152 by which the welt supports 132, 134 are forced into the welt crease, will yield to permit the clutch to be tripped as described. When the machine starts, rotation of the shaft 28 moves the rod 324 downwardly to compress the spring 332, the pressure of the spring 332 being transmitted through the arm 300 to the wedge block 274 to increase the pressure of the pads 258 on the shoe. This additional pressure obviously will always be substantially the same since the spring 332 is always compressed the same amount in each cycle irrespectively of the position of the pawl 304 on the ratchet 318, as determined by the distance the pads are held apart by the shoe, and also irrespectively of the lateral position of the pads as determined by the lateral position of the shoe and the differing inclinations or contours of its opposite sides. During the second half rotation of the shaft 28 the tension of the spring 332 is being relieved. The tacking operation, however, during which it is most important that the shoe be firmly held, occurs at substantially the middle of the cycle when the spring 332 is under greatest tension. The pressure applied through the spring 290 is maintained till the end of the cycle by the lock 243. When this lock is released the shaft 144 turns clockwise (Fig. 1) under the influence of several springs then under tension including the spring 152, causing the arm 312 to engage the collar 314 and release the pawl. The arm 300 is then swung up with considerable force by the spring 292 and the reaction of other springs under tension. The shock of this movement is, however, taken up by the spring 332 for, as the arm 300 swings up, its bifurcated end hits the downturned ends of the yoke 328 and lifts it against the spring 332. During the operation of the treadle to close the welt supports and supporting pads, the arm 300 moves down and the pawl engages the ratchet. If, however, the treadle is released without starting the machine, as may be desirable if the shoe is found to be mispositioned or for other reasons, the pawl is at once released by the arm 312 and the parts return to initial position.

The welt butting mechanism with which each of the side frames is provided will now be described, it being understood that the mechanism on one side frame is exactly similar to that on the other except that it is reversed in position and that for every part of one mechanism described there is a similar part on the other side frame whether shown or not. The H-head 39 (Fig. 11) and the blocks 42 by which movement of the head 39 is transmitted to the operating slides 46 have been referred to. Each slide 46 is held and guided for horizontal sliding movement only in its side frame by ribs 339 and between the side frame proper and a cover plate 341 (Fig. 3). The slide has an inclined face 340 which face is held by a T-tongue and T-groove connection to the corresponding face 342 of a cutter carrier 344, so that between the parts 46 and 344 there can be relative movement only in a right line lying in the plane of their inclined engaging faces 340, 342. Since the part 46 is held from vertical movement, movement of this part relatively to the part 344 will cause the part 344 to move vertically. Thus, assuming that there is resistance to the rearward movement of the part 344 with the part 46, movement of the part 46 rearwardly will first cause vertical downward movement of the part 344 until such movement is stopped; then, if movement of 46 continues in the same direction in spite of the resistance, both parts will move rearwardly and horizontally as one. When the motion of the part 46 is reversed, the resistance of the part 344 to movement will cause relative movement between the two, resulting in vertical upward bodily displacement of the part 344, and when the limit of this movement is reached, as determined by a stop screw 345 engaging the forward end of a slot 347 in the carrier 344 (Fig. 3), bodily forward, horizontal movement of the two as one. Thus, a knife 346 on the carrier 344 has movements in a rectangular path, the first movement being down, the next rearward, then upward, and then forward to the starting point. The resistance above assumed is provided, in the present construction, as follows: An ear 348 (Fig. 11) on the knife carrier 344 is pivoted at 350 to the rear part 352 of a link, the forward part 354 of the link being pivoted at 356 to a member 358. The two parts 352, 354 are threaded together so that the length of the link may be adjusted, the adjustment being maintained by a set nut 360. The member 358 is fixed on a shaft 362 which extends through the cover plate 341 of the side frame (Figs. 1, 2 and 4) and has fixed to it a drum 364. The periphery of the drum is flanged to receive a band 366 having secured to it a slotted lug 368, the slot of which engages a pin 370 on the cover plate 341 of the side frame. Through lugs 372 on the ends of the band passes a bolt 374 on which is a spring 376 and a nut 378 by which the tension of the band on the drum may be adjusted. The stationary band of course offers frictional resistance to rotation of the drum and hence to movement of the knife carrier 344 with which it is positively connected as described.

The extent of downward movement of the knife 346 has to be nicely adjusted with respect to the rear or anvil portion of the welt support so that the knife will co-operate therewith to sever the welt end. Thus, in Fig. 12 the knife 346 is shown as cutting the welt along the dot-and-dash line, the finishing end of the cut occurring at 380 where the knife reaches a surface 381 parallel to its direction of movement. Referring to Fig. 3, downward movement of the knife carrier is limited by contact of a stop 382 on the slide 46 with a face 384 of a block 386 which has a threaded stem 388 extending freely through an inclined sleeve 390 which is externally threaded in the carrier 344 and has a capstan head 392 by which it may be turned to adjust it lengthwise. A nut 394 on the stem serves to set the block firmly against the lower end of the sleeve. By reason of the inclined direction of adjustment of the sleeve a very sensitive or fine adjustment of the horizontal distance between the stop 382 and the face 384 of the block, and hence of the lower limit of movement of the knife, may be effected.

The welt butting knives or cutters 348 are alike, each having a uniform cross-section throughout its entire length of the shape shown in Figs. 3 and 12. The rearward or edge portion of the knife is supported in a transverse groove 399 in the forward end of the cutter carrier 344 and is clamped in place by a clamping member 400 which engages a face 401 (Fig. 12) of the knife and clamps it upwardly against a surface 403 (Fig. 5) of the cutter carrier, at the same time forcing it rearwardly into the groove 399. The upper end of the clamping member 400 is provided with a groove engaging a rib formed by a pin 405 seated in the carrier and is held against the knife by a bolt 402 passing through the clamping member between its ends and having thereon a thumb nut 404, tightening which forces the knife rearwardly and upwardly into engagement with the surface 403 and into the groove 399 to hold it firmly in position. In order to protect the cutting edge of the knife a recess 406 is provided at the apex of the groove so that it is impossible for the edge to be brought in contact with the carrier. The fact that the cutters are uniform in cross-section throughout their length is of particular importance since either cutter may be used in either the right or the left cutter carrier, it being understood that one end of the knife is clamped in the receiving groove while the other end projects inwardly from the cutter carrier into position for operation upon the welt ends. Obviously, if the knife in the right-hand cutter carrier becomes dull, it may be removed and placed in the left-hand cutter carrier and vice versa, thus bringing the unused, previously clamped portion of each knife into position for operation upon the welt ends. As shown in Fig. 3ª, the knife edge is not at right angles to the direction of its cutting movement as determined by the rearward movement of the cutter carrier, but is inclined rearwardly a few degrees so that it has a draw cut and therefore cuts much easier and cleaner than it would if arranged exactly at right angles to its direction of movement. The knife itself, however, is, of course, straight, the angular direction of its edge being effected by inclining the transverse groove 399 in the carrier 344 in which the knife is clamped.

In order to smooth out and hold down the welt in advance of the cutter, a presser-foot 408 (Fig. 12) is positioned just ahead of the cutter and projects laterally from a shank 410 that is slidably mounted in a guideway in the end of the cutter carrier 344 (Fig. 3). The shank 410 is provided with a lateral pin 412 which engages the lower end of a coiled spring 414 that is contained in a recess adjacent to said guideway and the upper end of which abuts against an adjustable screw 416, by means of which the compression of the spring may be varied as desired. By this construction the presser-foot 408 is yieldingly urged into engagement with the work. As shown in Fig. 12, the presser-foot 408 has substantially an edge contact with the welt just in advance of the knife edge and progressively maintains the portion of the welt being cut pressed into conformity with the portion of the surface of the welt supports beneath it as it advances with the knife.

The welt supports or crease finders 132, 134, hereinbefore referred to, engage the shoe in the welt crease and serve to position the shoe during the operations upon it, to tighten the upper over the last adjacent to the welt ends, and to support and position the ends of the welt, so that they are beveled off both longitudinally and transversely outward, and, moreover, are so shaped that the inseam stitches are not cut during the butting operation and the ends of the welt are squarely cut off.

The welt supports 132, 134 are adjustably supported at the forward ends of the swinging side frames 12, 14 and just below the welt butting knives 346. The form and mounting of these welt supports are best shown in Figs. 1, 2, 3 and 13, Fig. 13 illustrating the welt support for the right-hand side frame 14. A block 420 (Fig. 1) rests on the top face of a projection 422 of the side frame and has a cylindrical stem 424 which enters a bore in the front end of the side frame where it is held in adjusted position by a draw bolt 426. The block 420 has a forked projection 428 which engages a collared adjusting screw 430 threaded into the projection 422. By loosening the draw bolt 426 and turning the screw 430 the block 420 may be adjusted forwardly and rearwardly. The block 420 has a ledge 432 (Fig. 13) to receive the lower face of an anvil member and welt support holder 434 which has a cylindrical stem 436 entering a bore in the block 420 in which it is held in adjusted position by a draw bolt 438. The holder 434 has the surface 381 before mentioned, which lies in the plane of the cutting movement of the knife 346 and a guard extension 442 which projects over the heel-seat of the shoe and the upper surface of which is connected to the surface 382 by a surface 443. These three surfaces are in slightly different planes for a purpose to be later explained. The adjustment of the holder on the stem 436 is important because it determines the lateral position of the surface 443 and the welt support with respect to the tacker nozzle which descends and inserts a tack as close as possible in the corner 444 between the surface 443 and the guard extension 442 or in a notch formed in said corner as shown in Fig. 13. This adjustment, once determined, should be maintained, and when the holder 434 is removed or changed it should be restored to the same position as before. For this purpose a screw 446 is threaded through the block 420 in position to engage the holder 434 and adjust its position transversely of the ledge 432, the adjustment being maintained by a set-nut 448. The holder 434 has a dovetail slot 450 to receive a dovetail tongue 452 formed on the welt support 134 and a set-screw 454 is provided to hold the welt support in place in the holder. The top surface of the welt support must have a correct angle of inclination longitudinally of the shoe and with respect to the plane of cutting movement of the knife edge which is represented by the surface 443. This angle determines the length of the scarf made on the welt end by the knife and varies for different kinds of work but should be maintained the same while operating upon a given kind of work. Hence the machine is supplied with a set of interchangeable welt supports, the top or welt supporting faces of which are at different angles to the dovetail tongues 452 which tongues, of course, fit in the same groove 450 of the holder, this arrangement being practically preferable to having the welt support angularly adjustable with respect to the holder.

For the purpose of producing a bevel or scarf having the proper characteristics, the welt support 134 is provided with a peculiarly shaped and inclined upper surface 454. This surface is inclined transversely inwardly and downwardly from its upper outer edge toward its inner edge in three stages represented by the surfaces 452, 454, 456, in Fig. 13 the surfaces 454, 456 ending at the ends adjacent to the surface 443 of the anvil plate in an abrupt upward curvature 451 the top of which is flush with the edge of the surface 443, which edge forms a shoulder or shear plate with which the knife co-operates to produce a squarely cut end on the welt. The surface 443 at the point 445 extends slightly beyond the inner edge of the welt support 134 and the corner of the welt support adjacent to the curvature 451 is rounded off at 447 to allow the welt support to extend under the welt up to the stitches even if the stitches extend rearwardly beyond its point of engagement in the welt crease. The projecting point 445 and rounded corner 447 ensure that the welt will be squarely cut adjacent to the stitches without leaving a ragged end. The inclination and configuration of the upper face of the welt support is such that when the welt support is positioned beneath the end of the welt, and the presser-foot irons and holds down the welt in engagement with the welt support, said welt is so positioned that the welt butting cutter scarfs off the end of the welt on a bevel which is inclined both longitudinally and transversely outward in such manner as to leave the inseam stitches intact and also to cut off the end of the welt squarely. The guard plate surface 442 of the anvil is horizontal and perpendicular to the outer face of the anvil member and welt support holder 434. The surface 443 is inclined outwardly and downwardly two or three degrees and the surface 383 is inclined still further about the same amount. The knife is so adjusted that at the limit of its downward movement it will press upon the surface 383 hard enough to take up the slight backlash of the carrier 344 in its guide, will cut squarely along the front edge 380 of the surface 443 where the major portion of the welt end lies and will be relieved from contact with the guard plate surface 442. Obviously the length of the longitudinal bevel produced by the welt-butting cutter is determined by the longitudinal angularity or inclination of the upper surface of the welt support with respect to the path of travel of the cutter. Different lengths of the bevel are obtained by removing the welt supports and inserting others having a different longitudinal angularity. In some kinds of work where the welt is light and flexible, the drag of the cutter tends to bend inwardly the end of the welt and stretch the outer edge of the welt before it is cut off. The welt, after it is cut, draws back so that the desired square cut on the welt end is not obtained. To meet this condition a welt support of the form shown in Fig. 14 may be employed. Here the surface 452 of the welt support which engages the outer margin of the welt is formed with teeth or ribs 458 inclined rearwardly and outwardly with respect to the direction of movement of the knife. These ribs tend to stretch the welt laterally as the knife draws rearwardly upon it and prevent it from bending inwardly, thus causing the knife to cut the welt end off squarely.

The movement of the welt butting cutter carriers 344 also actuates the tacker mechanisms. For an understanding of the tacker mechanisms, reference may be had particularly to Figs. 3 and 4 which illustrate the tacker mechanism associated with the left-hand swinging side frame 12, which mechanism is similar to that carried by the right-hand side frame 14. The tacker mechanism comprises a driver bar slide 460 which is seated for sliding movement in a rectangular groove or way in the forward edge of the side frame which way is closed by a face plate 462. This slide 460 is bored longitudinally for the greater part of its length for the reception of a cylindrical driver bar 464. At its lower end the slide 460 is provided with a reduced bore through which a tack driver 466 extends (Fig. 3). The tack driver is secured to the lower end of the driver bar 464 in the usual manner. Also, the lower end of the driver bar slide 460 has secured thereto a suitable tack nozzle 468. At its upper end the driver bar is provided with a head 470, the rear end of which is slotted and receives a vertically disposed track 472. A roll 474 is carried by the head 470 which engages the track 472 and guides the bar in its movement through the driver slide. The extreme upper end of the driver bar carries a conical cap 475 which is engaged by a socket on one end of a coiled driving spring 476. The other end of the driving spring is connected to a clamp sleeve 478 having a stem which enters a clamp sleeve 480 having a bracket portion 482 secured to the side frame 12.

Pivoted by its lower end at 484 in a slot formed for its reception at the upper end of the face plate 462 is a latch lever 486 formed at its upper end as a detent 488 which is normally held in the path of movement of the driver bar head 470 by means of a spring plunger 490. The inward movement of the lever 486 is limited by a lug on the lever engaging a stop screw 494 threaded through the face plate 462. The driver head 470 is provided with a beveled surface 496 so located that on the upward movement of the driver bar 464 the detent 488 is forced to one side until the head 470 has reached a position above the detent when said detent snaps back beneath the head and supports the driver bar against downward movement. The latch lever 486 is also provided with a trip arm 498 which projects into the path of and is adapted to be engaged by a roll 500 on one arm 502 of a trip angle lever pivoted at 504 on the inner side of the side frame 12. The other arm 505 of the angle lever carries a screw 506 which lies in the path of an arm 507 which is fixed to the inner end of the shaft 362 (Figs. 3 and 11). This arm therefore will be turned toward the screw 506 in the lower end of the arm 505 by the rearward movement of the cutter carrier 344, and the roll 500 will be moved by the arm 502 to engage the arm 498 of the latch lever to release the latch. The timing is such that this release will occur substantially at the end of the rearward movement of the knife carrier 344. Upward movement of the slide 460 lifts the driver bar and causes its head 470 to be engaged and held by the detent 488 with the driver spring 476 under tension. To raise and lower the slide 460 it is formed on its rear side with rack teeth 508 which are engaged by the teeth of a segment 509 which is loosely mounted on the shaft 362. An arm 510 on the member 358 underlies a lug 512 on the segment 508. Forward movement of the carrier 344 therefore will turn the arm 510 in a direction to lift on the lug 512 and raise the driver bar slide 460. Movement of the slide 460 downwardly is effected yieldingly by an arm 514 also on the member 358. The arm 514 has an enlargement 516 bored to receive a spring 518 which enters a socket in a portion 520 of the segment 508. The tension of the spring 518 is maintained and controlled by a screw plug 524. As the carrier 344 moves rearwardly during the welt butting operation, the spring 518 moves the segment 509 clockwise, lowering the slide 460 and bringing the tack nozzle at its lower end into contact with the work. This contact is arranged to occur before the rearward movement of the carrier is completed, so that as the movement continues the plunger 518 yields and applies a substantial predetermined pressure upon the nozzle to force the upper firmly into contact with the innersole and last during the completion of the rearward movement of the carrier 344 and the consequent tripping of the driver to insert the tack. The rearward movement of the carrier 344 rotates the shaft 362 clockwise (Fig. 3) causing the arm 507 to engage the screw 506 and operate the trip angle lever 502 to force the roll 500 upwardly against the arm 498 of the latch lever 486 which swings outwardly and releases the detent 488 from the head 470 of the driver bar, thus permitting the spring 476 to act upon the driver to drive the tack.

The machine is provided with mechanisms for removing the cut off portions of the welt and also thread and wax from each of the knives should they stick thereto, this mechanism being substantially as disclosed in United States Letters Patent No. 1,534,061, granted April 21, 1925, on application of Edward Erickson. Each mechanism comprises a plunger 521 (Fig. 12) mounted in the knife carrier 344 which, during the return movement of the knife carrier, is given an inward movement in the direction of the knife edge, the plunger having a portion 522 which extends transversely of the top face of the knife and by its inward movement removes the welt end from the knife. In Fig. 11 is shown a lever 525 pivoted at 526 to a bracket on the carrier 344 and having a roll 528 lying between lugs on the plunger 521. The carrier, during its return or forward movement, of course moves in a higher plane than it does in its cutting movement, and during its forward movement a roll 530 on the lever 525 engages a stationary cam surface on the side frame which effects inward movement of the plunger as described.

The tack handling mechanism is shown in Figs. 1 and 15, the latter being an exploded view partly in section. This mechanism comprises the frame 16 secured to a table 18 formed on the main frame of the machine above the goose neck portion. The frame is open at the back and is hollowed out to form a chamber 549 to receive the tacks, the tack clearing mechanism and the upper end portion of the raceway. Associated with the frame are a tack pot 552 and three assemblies or units as follows: a raceway unit 554, a raceway end block unit 556, and a raceway cover unit 558. The open rear end of the chamber 549 is closed by the tack pot 552 which is supported for rotation on the shaft 559 fixedly mounted in a standard 560 projecting from the frame 16. The tack pot is held on the shaft by a thumb nut 562 and washer 564, by removing which the tack pot may be readily removed from the shaft in case it is desired to change the kind of tacks being used by the machine and may either be emptied of the tacks in it or a similar tack pot containing a different size of tacks may be substituted in its place. The front rim of the tack pot is provided at 566 with gear teeth which enter a circular groove 570 in the frame and mesh with the teeth of a pinion 572 mounted on a shaft 574 journaled in the frame, the teeth of the pinion entering the groove.

The shaft 574 which carries the pinion 572 also carries a gear 578 which meshes with a larger gear 580 fixed to a shaft 582 on which is secured at 584 a block 586 which movably supports clearer fingers 588. The fingers cooperate with extensions 592 of the raceway cover unit 558 to clear off the accumulation of tacks on the top of the raceway and assist in filling the raceway channels. The shaft 574 is continuously driven by a belt 594 (Fig. 1) running from the continuously running pulley member 200 to a pulley 596 loose on the shaft 574. A clutch operated by a handle 598 serves to connect and disconnect the pulley 596 with the shaft 574 to drive or stop the tack pot and clearer.

The raceway unit 554 comprises a spill pan 600 upon which the vanes 602 of the tack pot are continually spilling tacks as the tack pot is rotated, and a plurality of channels 604, 605 along which the tacks descend toward the clearer. A block 606 has fastened to it plates 608, 609, 610, 611, the plates 608, 609 and 610, 611 being spaced apart by filler pieces 612, 613 to form the channels 604, 605 for the tacks. The raceway unit is supported by a face 614 of the frame 16 and is held laterally in place by side walls 616 having holes 618. A pin 620 passes through the holes 618 in the walls and a hole 622 in the raceway unit, the hole being located below the points of the tacks as they travel down the raceways. The pin 620, face 614 and walls 616 hold the raceway unit in a predetermined fixed relation to the frame 16. At the lower end of the raceway is located an oscillating separating blade 624 having two separating slots 626, 627 (Fig. 16) which co-operate respectively with the two channels 604, 605 of the raceway. The separator plate is mounted for oscillation on a shaft 628 and at the proper time in the cycle of the machine, is given a movement by mechanism to be later described, to cause the slots 626, 627 of the separator plate to pass across the ends of the raceways and separate the lowermost tacks and deliver them to passages 630, 632 which lead to tack tubes 634, 636 which carry the tacks to the tackers. The tack passages 630, 632 are formed in a block 633 forming part of the end block unit 556 of the separating mechanism. This block 633 has secured thereto a plate 638 the upper edge of which lies in a rabbet 640 formed across the ends of the raceway plates and the block 606. The plate 638 is slotted at 642, 643, the slots being formed with ledges 644 which lie in the plane of the surfaces of the tack sustaining edges of the raceway plates 608, 609, 610, 611. The slots 642, 643 are alined with the raceway channels by a pin 646 on the raceway which engages a notch 648 in the plate 638. At the ends of the slots the ledges 644 are discontinued to allow separated tacks to fall downwardly through the tack passages 630, 632 which are formed as grooves in the block 633 open at one side. These grooves are closed by the filler pieces 612, 613 between the raceway plates. The block 633 has a latching plate 650 pivoted thereto at 652, the latch having a notch arranged to engage a groove 654 in the end of a stud 656 secured in the block 606. A hole 658 in the block 633 is engaged with the stud 656 and the block pushed against the end of the raceway unit, the latch 650 being then seated in the groove 654. The block is thus held to the raceway in position with the grooves 630, 632 against the filler pieces 612, 613, which close the open sides of the grooves to form closed tack passages. The block 633 is prevented from turning on the stud 656 by engagement of its lower face with the face 614 of the frame. It will be apparent that when the block 633 is removed the passages are opened up for inspection and can be easily cleared in case the tacks should clog in them.

The separator blade 624 is arranged to oscillate without any contact or sliding engagement either with the raceway unit, with the block 633 or its plate 638, it being supported and its path determined entirely by the shaft 628 upon which it is mounted as follows: The shaft 628 extends freely through a member 660 (Fig. 2) which has two arms 661, 662 extending radially from it. Each of the arms is provided at its end with a split clamp 663 (Fig. 15) to receive a stud 664. The ends of the separator blade 624 are secured respectively to the studs 664, 664. The studs may be adjusted vertically to locate the tack separating edge of the plate in proper vertical relation to a surface 666 on the end of the raceway unit, this surface being slightly more than the thickness of the blade 624 below the lower face of the plate 638 when the parts are in assembled relation. The blade 624 is so adjusted that it has no contact with the end block 633 or with the plate 638. The longitudinal position of the raceway is such that the inner or tack separating edge of the blade 624 is close to but out of contact with portions 668 of the ends of the raceway plates 608, 609, 610, 611, which portions are parallel with the arc of movement of the blade. A lug 670 (Fig. 2) on the member 660 which carries the separator is yieldingly connected by a spring 672 to the frame 16, the spring being under tension so as to tend to move the separator in a direction opposite to its separating movement. The member 660 has a gear segment 674 which is engaged by a gear segment 676 mounted loosely on a stud shaft 678 held by a set-screw 680. The segment 676 has a stop arm 682 carrying an adjusting screw 684 which engages the frame 16 to limit movement of the arm and the separator. The segment 676 has an operating arm 686 pivoted to a link rod 688 which is operated by power of the machine once in each cycle to swing the separator blade once across the ends of the raceways and back to separate a tack from each raceway and allow them to drop through the passages 630, 632 into the tack tubes 634, 636.

The link rod 688 is operated by mechanism shown in Fig. 5. The rod 688 passes loosely through separated sleeves 690, 692 connected by a bar 694. On the rod 688 between the sleeves are a clamp collar 696 and a spring 698. The sleeves 692 has an ear 700 mounted on a crank pin 702 of a rock shaft 704 which is journaled in a bracket 703 of the frame and to which is secured an arm 706 connected by a link 708 to the crank pin 338 on the disk 242 on the shaft 28. Rotation of the disk once in each cycle therefore imparts a positive push and a yielding pull to the rod 688. The positive push retracts the separator 624 assisted by the spring 672. The pull advances the separator yieldingly through the spring 698, which is stiff enough to overcome the spring 672, and separates the tacks, this movement of the separator being limited by the stop screw 684, upon engagement of which with the frame continued movement of the crank pin 700 may compress the spring 698. The separating movement is therefore controllable by the stop screw 684 to aline the openings at the end of the slots 626, 627 with the tack passages 630, 632. All backlash in the connection is taken up by the opposed springs 672 and 698, and the tack separating movement is effected yieldingly so that if there is undue resistance to separating movement of the separator plate by reason of jamming of tacks, the spring 698 can yield without causing breakage of parts.

A fourth or cover unit 558 of the separating mechanism comprises a member 710 which forms the front end of the chamber 549 and covers the portion of the raceways leading from the tack chamber to the block 633. To the forward end of the member 710 is pivoted a lid 712 which may be lifted in order to inspect the lower ends of the raceways including the slots in the plate 638 and which is held either in open or closed position by a spring 714 which engages suitably formed surfaces on the member 710. The member is held in place by a bolt 716 having a hook 718 which passes downwardly through a slot 720 in the block 606 of the raceway unit, and, by an upward sliding movement of the member 710, is caused to engage with the pin 620 which holds the raceway unit in position. The bolt 716 is provided with a thumb nut 722 by tightening which the member 710 is not only held in position, but the pin 620 is also clamped in place against accidental movement. The bolt 716 is reduced to receive a compression spring 724 which acts between the member 710 and the hook to move the hook downwardly to free it from the pin 620 when the thumb nut 722 is loosened. The extensions 592 which co-operate with the clearer fingers 588 are removably attached to the member 710 by screws 726 which extend through a retaining block 728 and the extensions into the member 710.

From the construction described it will be seen that the end block unit 556 may be removed by simply releasing the latch 650 from the stud 656 and sliding it longitudinally of the stud so that trouble with the separator or the tack passages in the block may be readily located. By loosening the thumb nut 722 the hook 718 may be disengaged from the pin 620 and the member 710 slid downwardly and outwardly and then removed upwardly to locate any trouble with the clearers or with the upper part of the raceways. In case there is trouble with the raceway unit, it is only necessary to remove the tack pot as described and then pin 620, whereupon the raceway unit may be removed by longitudinal and upward movement through the open end of the frame 16. The lid 712 may be lifted to ascertain whether tacks are flowing properly to the separator.

Having described the invention, what we claim as new and desire to secure by Letters Patent of the United States is:—

1. In a machine of the class described, upper securing means, means to tighten the upper, means for operating the tightening means and for applying pressure to the last before the machine is started, and means operated by power of the machine for increasing the pressure on the last.

2. In a shoe machine, means for performing a securing operation, means for tightening the upper, a shoe support, and means set by said tightening means for applying additional supporting pressure to the support.

3. In a machine of the class described, means for operating upon a shoe by which means its lateral position is determined, means operating uniformly to engage the two sides of the shoe irrespectively of its position as determined by the operating means and irrespectively of the shape of the last, and means for applying power pressure to the means for engaging means to sustain the last.

4. In a machine of the class described, means constructed and arranged to tighten an upper over a last at points adjacent to the two ends of the heel stiffener simultaneously, and automatic mechanism for inserting fastenings to hold the upper at the two sides of the last combined with power operated means operating by lateral pressure against the sides of the last to support the last substantially unyieldingly against the impact of the fastening inserting mechanism.

5. In a machine of the class described, the combination of means for tightening an upper over a shoe bottom, securing means movable to engage the tensioned upper, power means for moving the securing means to apply downward pressure to the upper, means for engaging opposite sides of the last to sustain it, and power means for operating the last sustaining means to apply lateral pressure to the last prior to the operation of the securing means.

6. In a machine of the class described, manually controlled means including devices constructed and arranged to engage a lasted welt shoe below the welt for tightening the upper over a last at opposite sides of the last simultaneously and for applying lateral pressure to the last, connected power operated mechanism for inserting fastenings arranged to be started automatically when a predetermined pressure has been applied to the upper and last, and power means acting prior to the fastening inserting operation for increasing the pressure of the upper tightening mechanism and the lateral pressure on the last.

7. In a shoe machine, upper securing means, manual means for applying initial lateral pressure to the shoe to sustain it for the upper securing operation, and power means for increasing the lateral pressure on the shoe.

8. In a machine of the class described, means constructed and arranged to tighten an upper over a last at opposite sides of the last, and automatic mechanism for inserting fastenings to hold the upper at the two sides of the last combined with a last support, manually operated means for operating the support to engage the last and power operated means for operating the support to sustain the last substantially unyieldingly against the impact of the fastening inserting mechanism.

9. In a shoe machine, means for performing a securing operation, means engaging in the welt crease for tightening the upper, a shoe support comprising devices engaging opposite sides of the shoe, means operated in conjunction with said tightening means for pressing said devices against the shoe, and power means for applying predetermined additional pressure to the devices.

10. In a shoe machine, upper securing means, manual means for applying initial lateral pressure to the shoe, an arm moved by said manual means to different positions according to the size of the shoe, a spring, and power means for compressing said spring the same amount in each operation and applying the spring pressure to said arm irrespectively of its position to increase uniformly the lateral pressure on the shoe.

11. In a shoe machine, means for performing a cutting operation, means for performing a securing operation, means for tightening the upper, automatic means for varying the action of said tightening means after the cutting operation, a shoe support, and means set by said tightening means for applying additional supporting pressure to the support.

12. In a shoe machine, the combination of supporting means for the shoe, blades movable in a plane parallel to the shoe bottom for engaging the welt crease of a welted shoe on opposite sides of the shoe, and power means for operating the blades to tighten the upper over the shoe bottom and for applying predetermined uniform supporting pressure to the supporting means.

13. In a shoe machine, the combination of supporting means for the shoe arranged to engage opposite sides of the shoe, blades movable in a plane parallel to the shoe bottom for engaging the welt crease of a welted shoe on opposite sides of the shoe, power means for operating the blades to tighten the upper over the shoe bottom, and means acting irrespectively of the individual characteristics of the last for applying predetermined uniform supporting pressure to the supporting means.

14. In a machine for operating on shoes, means engaging opposite sides of the last for sustaining the shoe, power means acting to apply additional pressure to the sustaining means firmly to support the shoe, and means for securing the upper to the bottom of the supported shoe.

15. In a machine of the class described, upper securing means, means to tighten the upper, means for applying pressure to the shoe before the machine is started, means for operating the tightening means and the pressure applying means, and means operated by the power of the machine for increasing the pressure of the pressure applying means on the shoe.

16. A machine for operating on shoe bottoms having, in combination, means for delivering a blow against the shoe bottom, means for supporting the shoe against the impact of the blow comprising members arranged to close against the counter portion of the upper between the bottom and the comb of the last, means for manually closing said members, and additional connections operating prior to the delivery of the blow for increasing the pressure of said members.

17. A machine for operating on the bottom of a lasted unsoled shoe having, in combination, means for operating on the shoe bottom, means for supporting the shoe in position to be operated upon comprising devices for engaging in the welt crease and against the counter portion of the upper above the comb of the last, manually operated means for moving said devices initially into operative relation to the shoe, and a crank for applying additional pressure to the shoe through said devices.

18. A machine for operating on the bottom of a lasted unsoled shoe having, in combination, means for operating on the shoe bottom, means for supporting the shoe in position to be operated upon comprising devices for engaging the counter portion of the shoe on opposite sides thereof, manually operated means for effecting like pressure of said devices against the two sides of the shoe, and power means acting prior to the operating means for increasing the pressure of said devices against the shoe.

19. In a machine of the class described, means operating upon a shoe, means for determining its lateral position, with respect to the operating means, supports operating uniformly to engage the two sides of the last irrespectively of its position as determined by the said position determining means, and means for applying pressure to the last supports in two stages to sustain the last.

20. In a machine of the class described, manually operated means including devices constructed and arranged to engage a lasted and welted shoe below the welt for tightening the upper over a last at opposite sides of the last simultaneously and for applying lateral pressure to the last, power operated mechanism for inserting fastenings arranged to be started automatically when a predetermined pressure has been applied to the upper and last, and means acting prior to the fastening inserting operation for increasing the pressure of the upper tightening mechanism and the lateral pressure on the last.

21. A machine of the class described comprising a shoe support arranged to engage opposite sides of an inverted shoe adjacent to the ends of the heel stiffener and below the bulge of the last, upper securing devices, and power means for pressing said devices against the upper and inserting fastenings.

22. In a machine of the class described, upper securing means, means acting to tighten the upper over the last, means for applying preliminary pressure to the opposite sides of the shoe below the tightening means and to start the machine, and power operated means for increasing the pressure on the two sides of the shoe prior to the securing operation.

23. A machine for operating on the bottom of a lasted unsoled shoe having, in combination, means for removing surplus material from the shoe bottom, means for supporting the shoe in position to be operated upon comprising devices for engaging in the welt crease and against the counter portion of the upper above the comb of the last, manually operated means for moving said devices initially into operative relation to the shoe, and power means for applying additional pressure to the shoe through said devices.

24. A machine for operating on the bottom of a lasted and welted shoe having, in combination, means for skiving off the welt ends, means for supporting the shoe in position to be operated upon comprising devices for engaging the counter portion of the shoe on opposite sides thereof, manually operated means for effecting like pressure against opposite sides of the shoe, and power means acting prior to the operating means for increasing the pressure of said devices against the shoe.

25. In a machine of the class described, shoe supporting means acting by lateral pressure on the shoe, upper securing means, means engaging the welt crease to tighten the upper, manual means for effecting the operation of the tightening means before the machine is started and for applying initial lateral pressure to the shoe, and power means for increasing the tightening effect of the tightening means and for increasing the lateral pressure on the shoe.

26. In a shoe machine, the combination of supporting means for the shoe, blades movable in a plane parallel to the shoe bottom for engaging the welt crease of a welted shoe on opposite sides of the shoe, and power means for operating the blades to tighten the upper over the shoe bottom and for applying supporting pressure to the supporting means.

27. In a machine of the class described, the combination of upper tacking means, manually operated means acting in the welt crease to tighten the upper over the last bottom and power operated means for effecting a further additional tightening of the upper prior to the action of the upper tacking means and for pressing the upper against the last between the welt crease and the comb of the last.

28. In a welt butting machine, welt supports to support the opposite welt ends of a welted and inverted shoe, means for pressing against opposite sides of the shoe below the bulge of the last to support it, butting cutters movable longitudinally of the welt to scarf off the welt ends, power means acting after the welt is butted to force the welt supports toward each other to tighten the upper and to apply additional pressure to the supporting means, and means for securing the upper so tightened to the shoe so supported.

29. In a welt butting machine, welt butting means, tacking means, welt supports, shoe supports engaging opposite sides of the shoe beneath the welt supports, manual means for moving the welt supports and the shoe supports into welt and shoe supporting position prior to the butting operation and effective upon final movement to start the machine, automatic means for additionally operating the welt supports to tighten the upper after the welt butting operation and prior to the tacking operation and for operating the shoe supports to increase their pressure on the shoe, and means for operating the tackers to press the tightened upper against the last so supported and secure it to the innersole.

30. In a machine of the class described, the combination of welt butting cutters, upper tackers, welt supports acting in the welt crease to tighten the upper over the shoe bottom, a shoe support to sustain the shoe, and power actuated means including springs for increasing the tightening action of the welt supports and the sustaining pressure of the shoe support between the initiation of the movement of the butting cutters and the operation of the tackers.

31. In a welt butting machine, welt supports to support the opposite welt ends, means for sustaining the shoe, butting cutters movable longitudinally of the welt to scarf off the welt ends, power means acting after the welt is butted to force the welt supports toward each other to tighten the upper, power means to apply additional pressure to the sustaining means firmly to support the shoe, and means for securing the upper so tightened to the shoe so supported.

32. In a machine of the class described, the combination of upper tacking means, manually operated means acting in the welt crease to tighten the upper over the last bottom, power operated means for effecting a further additional tightening of the upper prior to the action of the upper tacking means, additional power means for pressing the upper against the last between the welt crease and the comb of the last, and means for then operating the tacking means.

33. In a welt butting machine, means to tighten the upper on opposite sides of a welted and inverted shoe, means for pressing against opposite sides of the shoe below the bulge of the last to support it, power means to force the upper tightening means toward each other to tighten the upper and to apply pressure to the supporting means, and means for securing the upper so tightened to the shoe so supported.

34. In a machine of the class described, the combination of upper tackers, means acting in the welt crease to tighten the upper over the shoe bottom, a shoe support to sustain the shoe, and power actuated means including springs for effecting the tightening action of the tightening means and the sustaining pressure of the shoe support prior to the operation of the tackers.

35. In a machine of the class described, means to tighten the upper over the shoe bottom, tackers arranged to operate simultaneously at the two sides of the last, means to ensure pressure of the tackers against the tightened upper to secure the upper to the shoe bottom, and pressers engaging opposite sides of the shoe to support it against the pressure of the tackers.

36. In a machine of the class described, means to tighten the upper over the shoe bottom, tackers movable against the tightened upper to secure the upper to the shoe bottom, pressers engaging opposite sides of the shoe to support it against the pressure of the tackers, and power means for operating the pressers to hold the shoe during operation of the tackers.

37. In a machine of the class described, the combination of means for operating upon a shoe bottom, said means requiring shoes of different sizes to be located in similar relation to the operating means, means yieldingly held against the shoe during the positioning of the shoe, and means becoming effective upon starting of the machine to render the yielding means unyielding.

38. In a machine of the class described, the combination of means for operating on a shoe bottom, said means requiring different shoes to be located in different longitudinal positions relatively to the operating means, a stop movable by the shoe while it is being positioned, and means becoming effective during operation of the machine to prevent movement of the stop.

39. In a machine of the class described, the combination of a rearwardly yielding gage, means operable to lock the gage against movement, welt butting means, and an actuator for the butting means, said actuator acting to render the gage locking means effective prior to the action of the welt butting means.

40. In a machine of the class described, the combination of welt butting cutters movable longitudinally of the shoe to butt the welt, a gage movable rearwardly with and by the shoe while it is being positioned for the butting operation, and means acting automatically to hold the gage against movement during the action of the cutters.

41. In a welt butting machine, the combination of welt butting cutters movable to butt the welt, welt supports engaging in the welt crease, a stop for the shoe arranged to be pushed rearwardly by the shoe during the positioning of the welt ends with respect to said welt supports, and means for locking the stop against rearward movement while the cutters are acting.

42. In a machine of the class described, the combination of crease finders engaging the welt crease on opposite sides of the shoe and having visible indicia with respect to which the shoe is located longitudinally, a back gage movable with and by the shoe during the locating of the shoe, means for operating upon the shoe, and means for locking the gage against movement by the shoe during operation of the operating means.

43. In a welt butting machine, the combination of welt butting cutters movable longitudinally of the shoe to butt the welt, welt supports engaging in the welt crease to support the welt, means positioned by the shoe in its presentation to the welt supports, and means acting during the butting operation to prevent movement of said positioned means.

44. In a machine of the class described, the combination of welt supports engaging the welt crease on opposite sides of the shoe and having shoulders with respect to which the shoe is located longitudinally, butting knives co-operating with the shoulders to butt the welt, a back gage movable with and by the shoe during the locating of the shoe, means for operating upon the shoe, and means for locking the gage against movement by the shoe during operation of the operating means.

45. In a machine of the class described, the combination of means for butting the welt ends, welt supports requiring shoes of different sizes to be located in similar relation to the said supports, means yieldingly held against the shoe during the positioning of the shoe, and means becoming effective when the machine starts to render the yielding means unyielding.

46. In a machine of the class described, the combination of cutters for butting the welt, welt supports with respect to which shoes of different length are positioned in similar longitudinal positions relatively to the cutters, a stop movable by the shoe while it is being so positioned, and means becoming effective during operation of the machine to prevent movement of the stop.

47. In a machine of the class described, the combination of a rearwardly yielding gage, a pawl to lock the gage against movement, cutting means, and an actuator for the cutting means, said actuator acting to cause the pawl to lock the gage prior to the action of the cutting means.

48. In a machine of the class described, the combination of welt butting cutters movable longitudinally of the shoe to butt the welt, a gage movable rearwardly with and by the shoe while it is being positioned for the butting operation, a ratchet movable by the gage, a pawl for engaging the ratchet and moved during the action of the cutters to engage the ratchet.

49. In a welt butting machine, the combination of welt butting cutters movable to butt the welt, welt supports engaging in the welt crease, a stop for the shoe arranged to be pushed rearwardly by the shoe during the positioning of the welt ends with respect to said welt supports, and means for locking the stop against rearward movement when movement of the cutters begins, and for unlocking it when the cutters have substantially returned to normal position.

50. In a welt butting machine, the combination of welt butting cutters movable toward the shoe and longitudinally rearwardly of the shoe to butt the welt, welt supports engaging in the welt crease to support the welt, a stop yieldingly engaging the rear end of the shoe and positioned by the shoe in its presentation to the welt supports, and means acting during the movement of the cutters toward the shoe to lock the stop against rearward movement.

51. In a machine of the class described, the combination of a rearwardly yielding gage, means operable to lock the gage against movement, welt butting means, upper tacking means, welt crease engaging means, a plurality of springs, means acting through one of the springs to tighten the upper before the operation of the butting means, and means acting through another spring for tightening the upper before the operation of the tacking means, said means acting to render the gage locking means effective prior to the action of the welt butting means.

52. In a welt butting machine, the combination of welt butting cutters movable longitudinally of the shoe to butt the welt, welt supports engaging in the welt crease to support the welt, shoulders at the rear extremities of the supports arranged to co-operate with the cutters and to serve as indices with respect to which the shoe may be positioned longitudinally to show the operator how much of the welt will be removed, a gage movable rearwardly with and by the shoe while it is being positioned longitudinally with respect to said shoulders, and means acting automatically to hold the gage against movement during the action of the cutters.

53. In a welt butting machine, the combination of welt butting cutters movable to butt the welt, welt supports engaging in the welt crease and having shoulders adjacent to the points where the welt is to be severed, a stop for the shoe arranged to be pushed rearwardly by the shoe during positioning of the welt ends with respect to said shoulders, and means for locking the stop against rearward movement while the cutters are acting.

54. In a welt butting machine, the combination of welt butting cutters movable longitudinally of the shoe to butt the welt, welt supports engaging in the welt crease to support the welt, and shoulders at the rear extremities of the supports over which the cutting edges of the knives pass and with which they co-operate to sever the ends of the welt, means positioned by the shoe as it is located longitudinally with respect to said shoulders, and means acting during the butting operation to prevent movement of the positioned means.

55. In a welt butting machine, welt supports to support the welt ends of a welted unsoled shoe, butting cutters movable longitudinally of the welt to scarf off the welt ends, means acting after the welt is butted to tighten the upper over the shoe bottom, tackers movable against the tightened upper to secure the upper to the shoe bottom, and means engaging opposite sides of the shoe to support it against the pressure of the tackers.

56. In a machine of the class described, means for crowding in the upper at the opposite sides of a welted unsoled shoe adjacent to the welt ends, a tacker at each side of the shoe for securing the upper arranged for movement substantially perpendicular to the shoe bottom, and means for moving the tackers into contact with the shoe, applying through the tackers a predetermined pressure to the shoe, and then driving the tacks.

57. In a machine of the class described, means constructed and arranged to tighten an upper over a last adjacent to the ends of a heel stiffener, means for supporting the last, tackers for securing the tensioned upper, and means for forcing the tacker nozzles against the tightened upper prior to the insertion of the tacks.

58. In a machine of the class described, the combination of means for tightening an upper over a last, a tacker nozzle movable into securing relation to the tightened upper, power means for moving said nozzle including a spring to insure compression of the upper against the last bottom, and means rendered operative by said power means after the nozzle pressure is effected for causing the tack to be inserted.

59. In a machine of the class described, devices arranged to enter the welt crease at opposite sides of the the shoe to tighten the upper over the shoe bottom, co-operating securing means operating to engage the tensioned upper, means for sustaining the last, and means for applying predetermined downward pressure through the securing means prior to the securing operation.

60. A machine for use in making shoes comprising a shoe support arranged to engage opposite sides of an inverted last adjacent to the ends of the heel stiffener and below the bulge of the last, means to tighten the upper over the last bottom adjacent to the ends of the heel stiffener, upper securing devices, and power means for operating said devices to press them against the upper and to insert fastenings.

61. In a machine of the class described, the combination of means engaging in the welt crease at opposite sides of the shoe for tightening the upper over the last bottom, means beneath the crease engaging means for positively sustaining the last, tackers arranged for movement toward the last bottom, and means for actuating the tackers to press them against the shoe bottom until a predetermined pressure is obtained and then tripping the tackers.

62. In a machine of the class described, the combination of means for tightening an upper over a last, a tacker nozzle movable into securing relation to the tightened upper, power means for moving said nozzle to insure compression of the upper against the last bottom, and means rendered operative by said power means after the nozzle pressure is effected for causing the tack to be inserted.

63. In a machine of the class described, devices arranged to tighten the upper over the shoe bottom, securing means operating to engage the tightened upper simultaneously at the two sides of the last, and automatic means for applying predetermined downward pressure through the securing means prior to the securing operation.

64. In a machine of the class described, means constructed and arranged to tighten an upper over a last adjacent to the ends of a heel stiffener, means for supporting a last, tackers for securing the tensioned upper, and power means for forcing the tacker nozzles against the tightened upper with predetermined pressure prior to the insertion of the tacks.

65. In a machine of the class described, the combination of means engaging in the welt crease at opposite sides of the shoe for tightening the upper over the last bottom, means for butting the welt, means beneath the crease engaging means for positively sustaining the last, tackers arranged for movement toward the last bottom, and means for actuating the tackers to press them against the shoe bottom until a predetermined pressure is obtained and then tripping the tackers.

66. In a machine of the class described, means for crowding in the upper at the opposite sides of a welted unsoled shoe adjacent to the welt ends, means for cutting off the welt ends, a tacker at each side of the shoe for securing the upper adjacent to the end of the welt arranged for movement toward the shoe bottom, and means for moving the tackers into contact with the shoe, applying through the tackers a predetermined pressure to the shoe and then driving a tack.

67. In a machine of the class described, a driver, a spring for operating the driver, a latch for holding the driver with the spring under tension, an actuator, a tacker nozzle movable vertically by the actuator into position to insert a tack in the shoe, yielding connections between the actuator and the nozzle, and means operated by the actuator after the nozzle is pressed against the shoe for releasing the latch.

68. In a machine of the class described, the combination of means for tightening an upper over a shoe bottom, securing means movable to engage the tensioned upper, power means for moving the securing means to apply downward pressure to the upper, means for engaging opposite sides of the last to sustain it, and means acting automatically to apply lateral pressure to the last prior to the operation of the securing means.

69. In a machine for operating on shoes, tacking means, shoe supports engaging opposite sides of the shoe, manual means for moving the shoe supports into shoe supporting position prior to the tacking operation and effective upon final movement to start the machine, automatic means for additionally operating the shoe supports to increase their pressure on the shoe, and means for operating the tackers to press the tightened upper against the last so supported and secure it to the innersole.

70. In a machine for operating on shoes, means engaging opposite sides of the last for sustaining the shoe, power means acting to apply pressure to the sustaining means firmly to support the shoe, and securing means operating automatically to press the upper against the last bottom and insert fastenings.

71. In a machine of the class described, welt butting cutters, tackers movable together toward the shoe bottom, shoe locating means, a single actuator to lower the butting cutters to butting position and to lower the tacking means against the shoe bottom to secure the upper, and means for varying the lower position of the cutters without altering movement of the actuator.

72. In a welt butting machine, means for supporting the opposite welt ends, knives movable vertically and longitudinally of the welt relatively to the supports to sever the welt ends, operating means for effecting movement of the knives in a quadrilateral path, and means for varying the location of said path with respect to the position of the welt supporting means.

73. In a machine of the class described, welt butting cutters, shoe locating means, a single actuator to lower the butting cutters to butting position, and means for varying the lower position of the cutters without altering the movement of the actuator.

74. In a welt butting machine, means for supporting the opposite welt ends, knives movable vertically and longitudinally of the welt relatively to the supports to sever the welt ends, operating means for effecting movement of the knives in a quadrilateral path, and means for varying the vertical component of the movement of the knives.

75. In a machine of the class described, upper securing means, means acting in the welt crease to tighten the upper over the last at opposite sides of the last, means for applying preliminary pressure to the opposite sides of the last below the tightening means and to start the machine, and power operated means for increasing the pressure on the two sides of the last prior to the securing operation.

76. In a machine of the class described, means for locating and sustaining a shoe and its last in predetermined vertical position, a driver, a spring for operating the driver, a latch for holding the driver with the spring under tension, an actuator, a tacker nozzle movable vertically by the actuator into position against the shoe to insert a tack in the shoe bottom, yielding connections between the actuator and the tacker nozzle, and means operated by the actuator after the nozzle is pressed against the shoe bottom for releasing the latch.

77. In a welt butting machine, the combination of welt supports arranged to close against the shoe and engaging the shoe in the welt crease, and a vertically fixed height gage arranged to engage the heel-seat portion of the shoe and position the shoe vertically so that the welt supports when closed will enter the welt crease.

78. In a welt butting machine, the combination of cutters movable rearwardly of the shoe to butt the welt, welt supports engaging in the welt crease to support the welt, and a combined height and back stop for the shoe arranged to prevent rearward movement of the shoe during the action of the cutters and to position the shoe heightwise for the operation of the welt supports.

79. In a welt butting machine, the combination of welt supports arranged to close against the shoe and engaging the shoe in the welt crease, and a height gage comprising a long slender finger extending forwardly over the heel-seat arranged to engage the heel-seat portion of the shoe and position the shoe vertically so that the welt supports when closed will enter the welt crease.

80. In a welt butting machine, the combination of cutters movable rearwardly of the shoe to butt the welt, welt supports engaging in the welt crease to support the welt, and a combined height and back stop for the shoe arranged to prevent rearward movement of the shoe during the action of the cutters and to position the shoe heightwise for the operation of the welt supports, said height stop being adjustable vertically relatively to the back stop.

81. A welt butting machine having, in combination, a knife extending transversely of the welt and movable rearwardly, a welt support to sustain the welt for the action of the knife, and ribs on the welt support arranged to cause the drag of the knife during its cutting operation to strech the welt laterally.

82. In a machine of the class described, the combination with a tool for operating on a welt, said tool tending to stretch the outer edge of the welt, of a welt support having ribs directed to stretch laterally the welt during the action of the tool.

83. A welt butting machine having, in combination, a knife extending transversely of the welt and movable rearwardly, a welt support to sustain the welt for the action of the knife, and ribs on the welt support outwardly inclined with respect to the direction of movement of the knife and acting during the cutting operation of the knife to prevent the knife from stretching the outer margin of the welt.

84. In a welt butting machine, the combination with a knife for operating on a welt longitudinally thereof, said knife tending to stretch the outer edge of the welt, of a welt support having means acting to stretch the welt laterally during the action of the knife.

85. In a machine of the class described, the combination of a knife operating longitudinally of the welt to butt the welt and tending to bend inwardly the end of the welt, and means for counteracting the tendency of the knife to bend the welt and to cause the knife to cut the welt end squarely off.

86. In a welt butting machine, the combination of a knife operating longitudinally of the welt to butt the welt and tending by reason of resistance of the welt to the cutting action of the knife to bend inwardly the end of the welt, and means for preventing bending of the welt and assisting the knife to cut the welt end squarely off.

87. In a welt butting machine, a welt butting knife carrier movable directly toward the shoe and longitudinally of the shoe, a knife supported on the carrier at one end and projecting laterally of the shoe, a welt support, and an anvil plate with the front edge of which the knife co-operates in severing the welt, said plate and knife being relatively formed and arranged to cause said knife edge to operate with a shear-like action in severing the welt.

88. In a welt butting machine, a welt butting knife carrier movable directly toward the shoe and longitudinally of the shoe, a knife supported on the carrier at one end and projecting laterally of the shoe, a welt support, and an anvil plate with the front edge of which the knife co-operates in severing the welt, said plate and knife being relatively formed and arranged to maintain continuous pressure between the knife and the edge of the plate to cause the welt to be severed with a shear-like action.

89. In a welt butting machine, a welt butting knife movable longitudinally of the welt to scarf off the welt end, the knife edge being inclined backwardly with respect to its direction of movement, and an anvil plate having a face on which the knife is set to rub and a surface adjacent to said face across the edge of which successive portions of the cutting edge, lengthwise of the cutting edge, pass and effect a shearing cut upon the welt.

90. In a welt butting machine, a welt butting knife carrier movable directly toward the shoe and longitudinally of the shoe, a knife supported on the carrier at one end and projecting laterally of the shoe, a welt support, and an anvil plate with the front edge of which the knife co-operates in severing the welt, said plate being parallel to the direction of movement of the knife and being inclined transversely of the direction of movement of the knife, to maintain constant pressure between the plate and knife notwithstanding upward springing of the unsupported end of the knife.

91. In a welt butting machine, a welt butting knife carrier movable directly toward the shoe and longitudinally of the shoe, a knife supported on the carrier at one end and projecting laterally of the shoe, a welt support, and an anvil plate with the front edge of which the knife co-operates in severing the welt, said plate being parallel to the direction of movement of the knife and having portions arranged in planes at different angles transversely of the direction of movement of the knife, the knife being set to engage as it moves toward the shoe the inclined surface adjacent to it, to co-operate with the next inclined surface in making its cut, and to clear a third surface which forms a guard for the knife edge.

92. In a welt butting machine, the combination of a welt support, a knife arranged for movement longitudinally of the welt and having its edge arranged at a raking angle with respect to its direction of movement, and a plate having an edge to co-operate with the knife, said edge lying in an inwardly diverging direction with respect to the knife edge, the knife and edge co-operating to act as shears by cutting progressively across the welt toward its inner edge.

93. In a welt butting machine, the combination of a welt support, a knife supported at its outer end, extending transversely of the welt and arranged for movement longitudinally of the welt, said knife having its edge arranged at a raking angle with respect to its direction of movement, and a plate having an edge to co-operate with the knife, said edge lying in an inwardly diverging direction with respect to the knife edge, said plate edge having successive portions toward the unsupported end of the knife in progressively higher planes to compensate for upward flexure of the unsupported end of the knife and causing the knife and edge to co-operate as shear blades in cutting progressively across the welt toward its inner edge.

94. In a welt butting machine, the combination of means for holding a shoe in position, and a knife arranged for movement relatively to the shoe to butt the welt, said knife having a straight cutting edge extending transversely of the welt and having said edge inclined to its direction of movement to cause the knife to operate with a draw cut.

95. In a welt butting machine, the combination of means for holding a shoe in position, and a knife arranged for movement relatively to the shoe to butt the welt, said knife having a straight edge extending transversely of the welt and having its edge inclined at a rearward rake to its direction of cutting movement to cause the knife to operate with a draw cut.

96. In a welt butting machine, the combination of welt supports, knife carriers movable longitudinally of the shoe, and knives in said carriers arranged with their cutting edges outwardly diverging.

97. In a welt butting machine, the combination of welt supports, knife carriers movable longitudinally of the shoe, and knives in said carriers arranged with their cutting edges at an obtuse angle to each other to cause their cutting action to progress inwardly of the shoe from the outer edges of the welt.

98. In a machine of the class described, a knife carrier having a groove to receive the edge of an end portion of the knife, a face on the carrier to receive the top surface of the knife, and a clamp on the carrier arranged to press against the rear end of the knife to clamp the knife in the groove and to apply an upward component of pressure to the knife to hold its top surface against said face.

99. In a welt butting machine, a welt support having an abrupt curvature at its inner edge adjacent to the end of the welt, an anvil plate extending laterally beyond the inner edge of the welt, and a knife co-operating with the anvil plate to effect a shear cut across the welt, the corner of the welt support adjacent to said plate and the inseam being rounded off to permit the welt support to be forced against the stitches so that the knife and anvil plate will effect a clean cut across the welt including the portion located inwardly of the stitches.

100. In a welt butting machine, a knife arranged to cut in a given plane, a welt support having a longitudinally concave configuration to which the end portion of the welt is conformed prior to the action of the knife, and a welt presser for conforming the welt to the shape of the welt support, said presser having substantially an edge contact transversely of the welt in advance of the knife acting progressively to force the welt into the concavity of the welt support during the cutting action of the knife.

101. In a machine of the class described, means for operating upon a shoe, means for engaging the two sides of the shoe after it has been positioned with respect to the operating means with uniform pressure irrespectively of the position or shape of the shoe, and means for applying additional pressure to the pressure applying means to sustain the shoe against the thrust of the operating means.

102. In a machine of the class described, means for operating on a shoe tending to thrust the shoe rearwardly, a rearwardly yielding gage for the rear end of the shoe, a lock for the gage, an actuator for the operating means, and connections from the actuator for operating the lock.

103. In a machine of the class described, members for engaging opposite sides of the last, connections for applying preliminary pressure to said members, an arm movable with said connections, a power shaft, connections from the shaft including a spring for applying additional pressure to said arm to increase the pressure on said members, and means utilizing said spring to lessen the shock of the arm when it returns to normal position.

104. In a machine of the class described, pressure pads for engaging opposite sides of a lasted shoe, connections including a spring for applying preliminary pressure to the pads, a treadle for operating the connections, a lock for holding the pads under the treadle-applied pressure, an arm moved by said connections to a position determined by the amount of separation of the pads, and power operated connections including a pawl for picking up the arm in the position in which it is placed by the treadle and applying to it a predetermined pressure further to force the pads against the shoe.

105. In a machine of the class described, pressure pads for engaging opposite sides of a lasted shoe, connections including a spring for applying preliminary pressure to the pads, a treadle for operating the connections, a lock for holding the pads under the treadle-applied pressure, an arm moved by said connections to a position determined by the amount of separation of the pads, a power shaft, connections from the shaft to said arm including a ratchet and pawl operable by the shaft to apply additional pressure to said arm which pressure is transmitted to said pads, a cam on said shaft for releasing the lock, a member operated by the release of the lock for disengaging the pawl to release the arm, and a spring for absorbing the shock of the return movement of the arm.

106. In a machine of the class described, a knife carrier, an actuator for the carrier which moves the carrier downwardly and then horizontally, a stop on the actuator, an adjustable block on the carrier engaged by said stop to limit downward movement of the carrier, an inclined stem on said block, a sleeve enclosing said stem and threaded into the carrier for longitudinal adjustment, and means for clamping the block against said sleeve.

107. In a machine of the class described, a tool carrier, a reciprocating actuator for the carrier, said carrier and actuator being arranged for limited relative movement to effect movement of the carrier transversely of the movement of the actuator, and relatively rotating friction surfaces arranged to oppose movement of the carrier and actuator together when the actuator is moved in either direction, and permitting movement of the carrier and actuator together in the same direction after said limited relative movement has taken place.

108. In a machine of the class described, the combination of a knife carrier, an actuator, connections between the carrier and the actuator permitting limited relative movement of the cutter and carrier and then movement of the two together, and means comprising relatively rotating friction surfaces to prevent movement of the two together until their relative movement has taken place.

109. In a machine of the class described, the combination of a knife carrier, an actuator, connections between the carrier and the actuator permitting limited relative movement of the cutter and carrier and then movement of the two together, and means comprising a drum and brake band arranged to oppose movement of the carrier.

In testimony whereof we have signed our names to this specification.

GEORGE GODDU.
FRED L. MACKENZIE.